(12) United States Patent
Zhao et al.

(10) Patent No.: US 10,066,996 B2
(45) Date of Patent: Sep. 4, 2018

(54) MEASURING DEVICE, ELECTRONIC APPARATUS, AND MEASURING METHOD

(71) Applicant: Seiko Epson Corporation, Tokyo (JP)

(72) Inventors: Danjun Zhao, Shiojiri (JP); Masanobu Kobayashi, Chino (JP)

(73) Assignee: Seiko Epson Corporation (JP)

( * ) Notice: Subject to any disclaimer, the term of this patent is extended or adjusted under 35 U.S.C. 154(b) by 29 days.

(21) Appl. No.: 15/259,344

(22) Filed: Sep. 8, 2016

(65) Prior Publication Data
US 2017/0074723 A1     Mar. 16, 2017

(30) Foreign Application Priority Data

Sep. 11, 2015    (JP) ................................. 2015-179390

(51) Int. Cl.
| | |
|---|---|
| G01N 21/00 | (2006.01) |
| G01J 3/28 | (2006.01) |
| G01J 3/26 | (2006.01) |
| G01J 3/51 | (2006.01) |
| G01J 3/02 | (2006.01) |
| G01J 3/42 | (2006.01) |

(52) U.S. Cl.
CPC ............. *G01J 3/2803* (2013.01); *G01J 3/027* (2013.01); *G01J 3/26* (2013.01); *G01J 3/51* (2013.01); *G01J 2003/283* (2013.01); *G01J 2003/425* (2013.01)

(58) Field of Classification Search
CPC .. G01J 3/2803; G01J 3/027; G01J 3/26; G01J 3/51; G01J 2003/283; G01J 3/425
USPC .......................................................... 356/73
See application file for complete search history.

(56) References Cited

U.S. PATENT DOCUMENTS

| | | | | |
|---|---|---|---|---|
| 2005/0117042 | A1* | 6/2005 | Hirotsu | ............. H01L 27/14601 348/308 |
| 2011/0074995 | A1* | 3/2011 | Rafferty | ............. H04N 5/35563 348/308 |
| 2012/0241590 | A1* | 9/2012 | Savoy | ............... H01L 27/14625 250/208.1 |
| 2016/0372507 | A1* | 12/2016 | Yang | .................. H01L 27/14621 |

FOREIGN PATENT DOCUMENTS

JP     2011-101180 A     5/2011

\* cited by examiner

*Primary Examiner* — Hina F Ayub
(74) *Attorney, Agent, or Firm* — Harness, Dickey & Pierce, P.L.C.

(57) ABSTRACT

A measuring device includes a first light receiving element that receives measurement light and outputs a first output value, and a second light receiving element that receives the measurement light and outputs a second output value which is different from the first output value. A weighted composition is performed on the first output value and the second output value.

20 Claims, 10 Drawing Sheets

MEASURING DEVICE, ELECTRONIC APPARATUS, AND MEASURING METHOD

BACKGROUND

1. Technical Field

The present invention relates to a measuring device, an electronic apparatus, and a measuring method.

2. Related Art

In the related art, an imaging device is known in which a plurality of image data items having different exposure amounts (for example, a plurality of different exposure time lengths) is acquired by imaging an object, and a composite image of which a dynamic range is expanded by composing the plurality of image data items is generated (for example, JP-A-2011-101180).

An imaging device disclosed in JP-A-2011-101180 includes an imaging element that can output a plurality of pixel data items corresponding to the different exposure time lengths, that is, so-called a non-destructive readable imaging element. Then, in each pixel, a weighted composition corresponding to the exposure amount is performed on each of a plurality of pixel data items obtained at different exposure time lengths, and then, a composite image is generated. In this way, it is possible to generate a composite image of which the dynamic range is expanded.

However, in a device to which the non-destructive readable imaging element disclosed in JP-A-2011-101180 is adopted, a cost of the imaging element is high or a dedicated drive circuit needs to be provided for reading out the pixel data in each pixel at a plurality of different exposure time lengths. Therefore, there is a problem in that the cost of manufacturing the device increases.

SUMMARY

An advantage of some aspects of the invention is to provide a measuring device, an electronic apparatus, and a measuring method that can suppress the increase of manufacturing cost and can expand the dynamic range when performing a light amount detection using a light receiving element.

According to an application example of the invention, there is provided a measuring device including a first light receiving element that receives measurement light and outputs a first output value, and a second light receiving element that receives the measurement light and outputs a second output value which is different from the first output value. A weighted composition is performed on the first output value and the second output value.

The measuring device according to the present application example is configured to include the first light receiving element and the second light receiving element that output output values different from each other when one measurement light received, and acquires the first output value from the first light receiving element and the second output value from the second light receiving element to perform the weighted composition. In this configuration, it is possible to expand a dynamic range of the composite value by performing the weighted composition on the first output value and the second output value and acquiring the composite value (for example, a composite reflectance). In addition, it is possible to suppress the increase of the manufacturing cost compared to the case of using the non-destructive readable imaging element described above that can acquire the output values corresponding to the different exposure time lengths (exposure amount) from one light receiving element.

In the measuring device according to the present application example, it is preferable that exposure time lengths of the first light receiving element and the second light receiving element are different from each other.

In the present application example, the exposure time lengths of the first light receiving element and the second light receiving element are different from each other. That is, it is possible to obtain a plurality of output values from one measurement light by causing each light receiving element to output output values corresponding to the exposure time lengths different from each other.

In the measuring device according to the present application example, it is preferable that light sensitivities of the first light receiving element and the second light receiving element are different from each other.

In the present application example, the light sensitivities of the first light receiving element and the second light receiving element are different from each other. In this way, it is possible to acquire a plurality output values from one measurement light. In addition, even in a case where the measurement light is exposed from the first light receiving element and the second light receiving element during the same exposure time length, it is possible to acquire the output values different from each other. In this way, it is possible to achieve both the reduction of the exposure time length and the expansion of the dynamic range compared to the case of acquiring the output values in accordance with the exposure time length using light receiving elements having the same light sensitivity. For example, the measurement light from the low brightness region in the measuring object can be exposed in a short exposure time length using the high-sensitivity light receiving element. Therefore, it is possible to shorten the exposure time length. In addition, the exposure amount can appropriately detected by exposing the measurement light from the low brightness region using the high-sensitivity light receiving element and by exposing the measurement light from the high brightness region using the low-sensitivity light receiving element, and thus, it is possible to expand the dynamic range.

In the measuring device according to the present application example, it is preferable that a weight value in the weighted composition is based on a greater output value among the first output value and the second output value.

In the present application example, the weight value is set based on the greater output value among the first output value and the second output value, and then, the weighted composition is performed.

Incidentally, in a case where the first output value from the second light receiving element is greater than the second output value, for example, the exposure time length is set longer or the light sensitivity is set larger compared to the case of the first light receiving element. Therefore, with respect to one measurement light, the output value from the second light receiving element is large. In this case, the exposure amount of the measurement light from the high brightness region in the second light receiving element is more easily saturated than that in the first light receiving element. Therefore, there is a possibility that the amount of light cannot be detected with a high accuracy. Accordingly, by performing the weighted composition with the output value of above-described one light receiving element which is easily saturated as a reference, the weighted composition can be appropriately performed. Therefore, it is possible to suppress the decrease of the detection accuracy and to expand the dynamic range.

In the measuring device according to the present application example, it is preferable that the weight value varies based on increase or decrease of the greater output value of the first output value and the second output value.

In the present application example, the weight value is caused to vary based on the increase or decrease of the greater output value among the first output value and the second output value. In this way, as described above, by performing the weighted composition based on the increase or decrease of the output value from one light receiving element which is easily saturated, the weighted composition can be appropriately performed. Therefore, it is possible to suppress the decrease of the detection accuracy and to expand the dynamic range.

In the measuring device according to the present application example, when the second output value is greater than the first output value, the weight value of the second output value becomes smaller in accordance with the increase of the second output value.

In the present application example, the weight value of the second output value becomes smaller in accordance with the increase of the second output value. In this way, in a case of measuring the measurement light from the low brightness region, the weight value of the second output value of the second light receiving element which can detect the amount of light from the low brightness region with a high accuracy can be made large in the low brightness region. On the other hand, in a case of measuring the measurement light from the high brightness region, the weight value of the second output value of the second light receiving element which is easily saturated in the high brightness region can be made small. Therefore, it is possible to expand the dynamic range and improve the accuracy of detecting the amount of light.

In the measuring device according to the present application example, it is preferable that the weight value of the second output value becomes zero in a case where the second output value becomes a maximum value.

In the present application example, in a case where the second output value is a maximum value, the weight value of the second output value is zero. In this way, the weighted composition can appropriately be executed without using the second output value of the second light receiving element which may possibly be saturated in the weighted composition.

In the measuring device according to the present application example, it is preferable that the weight value of the second output value is a value of n-th degree function of the second output value, and the n-th degree function has a maximum value in a case where the second output value is zero.

In the present application example, a value of n-th degree function of the second output value which becomes maximum in a case where the second output value is zero is set as the weight value of the second output value. In this configuration, for example, in the vicinity of the second output value zero, it is possible to reduce the decreased amount of the weight value of the second output value in accordance with the increase of the second output value compared to the case of decreasing the weight value to be proportional to the increase of the second output value. Therefore, in the low brightness region, the weight value of the second output value can be increased, and thus, it is possible to improve the accuracy of detecting the amount of light.

In the measuring device according to the present application example, it is preferable that a composite reflectance $R_{HDR}$ which is a result of the weighted composition of the first output value and the second output value satisfies Equation (1) described below when the first output value is D1, a reference value of the first output value is Dref1, the second output value is D2, a reference value of the second output value is Dref2, and a maximum value of the second output value is Dmax.

$$R_{HDR} = \frac{D1}{Dref1} \times \left(\frac{D2}{Dmax}\right)^2 + \frac{D2}{Dref2} \times \left\{1 - \left(\frac{D2}{Dmax}\right)^2\right\} \quad (1)$$

Here, the reference value of the first output value and the reference value of the second output value are the output values from the first light receiving element and the second light receiving element when measuring the white reference object.

In the present application example, it is possible to calculate the composite reflectance as the composite value that satisfies Equation (1) described above using the first output value and the second output value. In addition, it is possible to suppress the increase of the processing load of the composite processing by calculating the composite reflectance using the quadratic function which is the lowest order polynomial function (n-th degree function) having a maximum value.

In the measuring device according to the present application example, it is preferable that the weight value of the second output value is a first value when the second output value smaller than a first threshold value, decreases in accordance with the increase of the second output value when the second output value is a value between the first threshold value and a second threshold value, and is a second value in a case where the second output value exceeds the second threshold value.

According to the present application example, the weight value of the second output value is set to be a first value which is greater than the second value, that is, a fixed value when the second output value is smaller than a first threshold value; is set to decrease in accordance with the increase of the second output value when the second output value is a value between the first threshold value and a second threshold value; and is set to be a second value which is smaller than the first value, that is, a fixed value in a case where the second output value exceeds the second threshold value. That is, the weight value is fixed to be the maximum value in a case of measuring the low brightness region in which the amount of light can be detected with higher accuracy by the second light receiving element than by the first light receiving element. In addition, in a case of measuring the high brightness region in which the second light receiving element is possibly saturated, the weight value is fixed to be the minimum value. Therefore, it is possible to expand the dynamic range and reduce the processing load of the composite processing.

In the measuring device according to the present application example, it is preferable that, when the second output value is a value between the first threshold value and the second threshold value, the weight value of the second output value is a value of n-th degree function of the second output value, and the n-th degree function has the maximum value when the second output value is the first threshold value.

In the present application example, the value of n-th degree function of the second output value which becomes maximum in a case where the second output value is the first threshold value is set as the weight value of the second output value. In this configuration, for example, the weight value of the second output value can be made large compared to the case of decreasing the weight value of the second output value so as to be proportional to the increase of the second output value, and thus, it is possible to improve the accuracy of detecting the amount of light.

In addition, it is possible to make the weight value of the second output value gradually approach the first value in accordance with the second output value going toward the first threshold value. Therefore, it is possible to make the weight value of the second output value be a value of the function of the second output value that makes a smooth connection at the point of the first threshold value. In this way, when performing the weighted composition, it is possible to suppress the composition value from being discontinuous or from rapidly changing due to the fact that the amount of variation of the weight value is large in the vicinity of the first threshold value.

In the measuring device according to the present application example, it is preferable that the weight value of the second output value is a value of n-th degree function of the second output value when the second output value is a value between the first threshold value and the second threshold value, and the n-th degree function has the minimum value when the second output value is the second threshold value.

In the present application example, the value of n-th degree function of the second output value which becomes minimum in a case where the second output value is the second threshold value is set as the weight value of the second output value. In such a configuration, in the vicinity of the second threshold value which is the minimum value, it is possible to make the weight value of the second output value gradually approach the second value. Therefore, it is possible to make the weight value of the second output value be a value of the function of the second output value that makes a smooth connection before and after the point of the second threshold value. When performing the weighted composition, it is possible to suppress the composition value from being discontinuous or from rapidly changing due to the fact that the amount of variation of the weight value is large in the vicinity of the second threshold value.

In the measuring device according to the present application example, it is preferable that the composite reflectance $R_{HDR}$ which is the result of the weighted composition of the first output value and the second output value satisfies Equation (2) described below when the first output value is D1, the reference value of the first output value is Dref1, the second output value is D2, the reference value of the second output value is Dref2, the first threshold value is d1, and the second threshold value is d2.

$$R_{HDR} = \frac{D1}{Dref1} \times \left\{-2 \times \left(\frac{D2-d1}{d2-d1}\right)^3 + 3 \times \left(\frac{D2-d1}{d2-d1}\right)^2\right\} + \\ \frac{D2}{Dref2} \times \left\{2 \times \left(\frac{D2-d1}{d2-d1}\right)^3 - 3 \times \left(\frac{D2-d1}{d2-d1}\right)^2 + 1\right\} \quad (2)$$

In the present application example, it is possible to calculate the composite reflectance as the composite value that satisfies Equation (2) described above using the first output value and the second output value. In addition, it is possible to suppress the increase of the processing load of the composite processing by calculating the composite reflectance using the cubic function which is the polynomial function of lowest order having a maximum value and a minimum value.

In the measuring device according to the present application example, it is preferable that the device includes the light receiving section having a plurality of pixels configured to include the first light receiving element and the second light receiving element.

In the present application example, each pixel in the light receiving section is configured to include the first light receiving element and the second light receiving element. In such a configuration, it is possible to perform the weighted composition on the first output value and the second output value for each pixel to calculate the composite value, and thus, it is possible to generate the composite image in which the dynamic range is expanded, based on the composite value for each pixel.

In the measuring device according to the present application example, the device further includes a spectroscope that spectrally disperses a light from an object, and emits the measurement light to the first light receiving element and the second light receiving element.

In the present application example, the light spectrally separated by the spectroscope is measured. In this way, it is possible to acquire the composite value of the light of which the wavelength is selected by the spectroscope. In addition, in a case where a spectroscope which can select a plurality of wavelengths is adopted, the composite values of the plurality of selected wavelengths can be acquired, and thus, it is possible to calculate the spectrum or the color measurement value as a result of the special measurement using the composite values.

An electronic apparatus according to another application example of the invention includes the measuring device according to application example described above.

The electronic apparatus in the present application example includes the measuring device in the application example described above. The measuring device is configured to include the first light receiving element and the second light receiving element that output the output values different from each other when one measurement light is received, and the first output value from the first light receiving element and the second output value from the second light receiving element are acquired to perform the weighted composition. In this configuration, by performing the weighted composition on the first output value and the second output value and acquiring the composite value (for example, the composite reflectance), it is possible to expand the dynamic range of the composite value. Therefore, in the electronic apparatus, it is possible to execute the processing (for example, the estimation of the spectrum, the calculation of the color measurement value, and the generation of the color image in which the composition is performed on the spectral images) using the measurement result acquired in the expanded dynamic range.

In addition, it is possible to suppress the increase of the manufacturing cost of the measuring device and the electronic apparatus compared to the case of using the nondestructive readable imaging element described above that can acquire the output values corresponding to the different exposure time lengths (exposure amount) from one light receiving element.

A measuring method according to another application example of the invention is a method in the measuring device that includes a first light receiving element that receives measurement light and outputs a first output value, and a second light receiving element that receives the measurement light and outputs a second output value which is different from the first output value, the method includes acquiring the first output value and the second output value, and performing a weighted composition on the first output value and the second output value.

In the measuring method in the present application example, the weighted composition is performed on the first output value and the second output value which are acquired by receiving one measurement light and which are different from each other. In this way, similarly to the application example described above, the dynamic range of the composite value that can be obtainable by the weighted composition can be expanded.

In addition, according to the measuring method in the present application example, it is possible to acquire the composite value by performing the weighted composition on the first output value from the first light receiving element and the second output value from the second light receiving element. Therefore, it is possible to suppress the increase of the cost of manufacturing the measuring device without being needed to provide the configuration so as to output the output values corresponding to the exposure time length by adopting the non-destructive readable imaging element described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a color measuring device as a first embodiment for a measuring device and an electronic apparatus in the invention will be described based on the drawings.

Configuration of the Color Measuring Device

Figure 1:
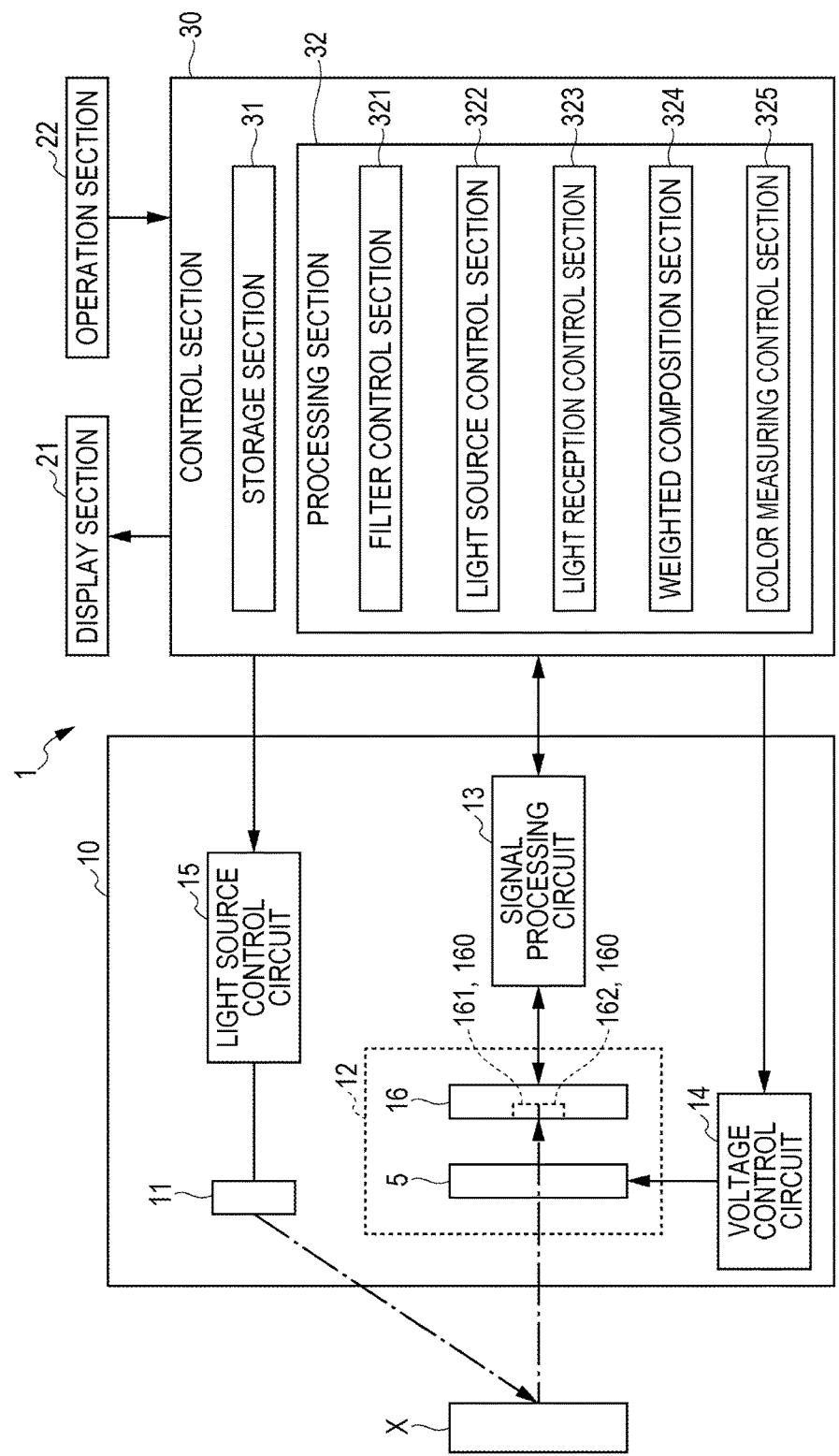
FIG. 1 is a block diagram illustrating a schematic configuration of a color measuring device in a first embodiment of the invention.

FIG. 1 is a block diagram illustrating a schematic configuration of the color measuring device in the first embodiment of the invention.

As illustrated in FIG. 1, a color measuring device includes an optical module 10, a display section 21, an operation section 22, and a control section 30 that controls the optical module 10 and the display section 21 and processes a signal output from the optical module 10.

The color measuring device 1 irradiates a measuring object X with a light, acquires a first spectral image and a second spectral image of which pixel values are different as spectral images for each wavelength in a measuring target light reflected from the measuring object X, and then, acquires a composite spectral image of which the dynamic range is expanded, for each wavelength. Then, the color measuring device 1 acquires results of color measurement in the imaging range using the composite spectral image acquired for each wavelength.

Configuration of the Optical Module

The optical module 10 includes a light source section 11, a light receiving section 12, a signal processing circuit 13, a voltage control circuit 14, and a light source control circuit 15. In addition, the light receiving section 12 includes a wavelength variable interference filter 5 and an imaging element 16.

The optical module 10 irradiates the measuring object X with an illumination light from the light source section 11, introduces the measuring target light reflected from the measuring object X to the wavelength variable interference filter 5 in the light receiving section 12 through an incident optical system (not illustrated), and then, receives the light transmitted the wavelength variable interference filter 5 at the imaging element 16. A detection signal output from the imaging element 16 is output to the control section 30 via the signal processing circuit 13.

Configuration of the Light Source Section

The light source section 11 irradiates the measuring object X with a white light to illuminate the measuring object X. The light source section 11 is configured to include LEDs of three colors: for example, red, green, and blue. A white LED which is a combination of a blue LED and a fluorescent material that causes the blue LED to emit a yellow light as an excitation light, or a white LED from which a white color can be obtained by causing fluorescent materials to emit the red, green, and blue lights from a purple LED, may be used. In addition, for example, other light sources such as a halogen lamp may be used as the light source section 11.

Figure 2:
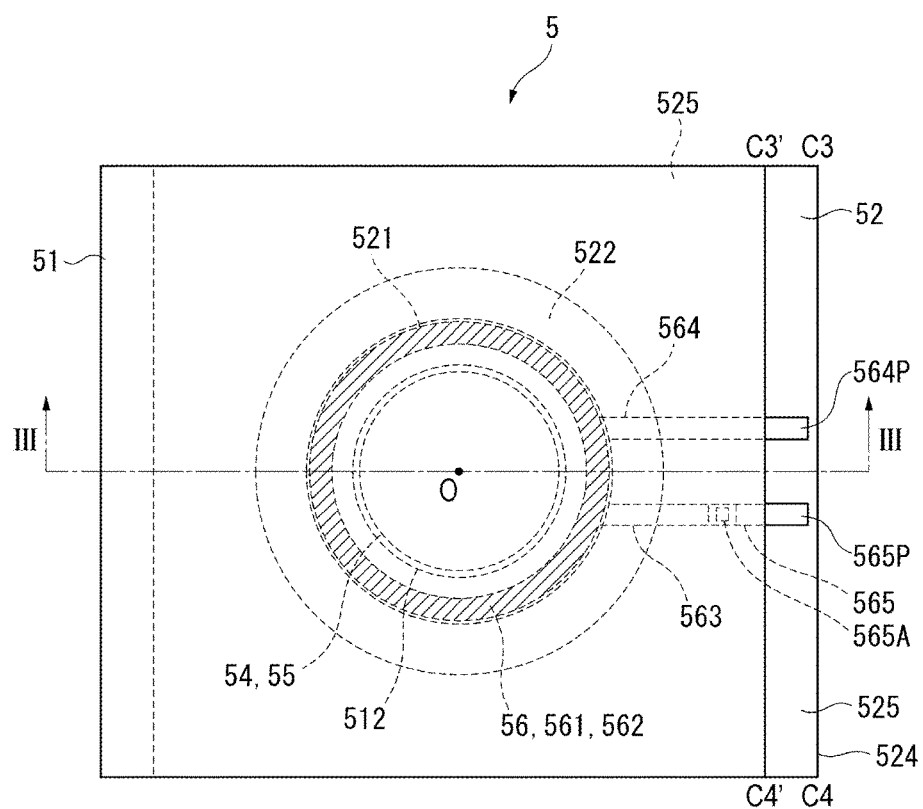
FIG. 2 is a plan view of a schematic configuration of a wavelength variable interference filter in the first embodiment.
Figure 3:
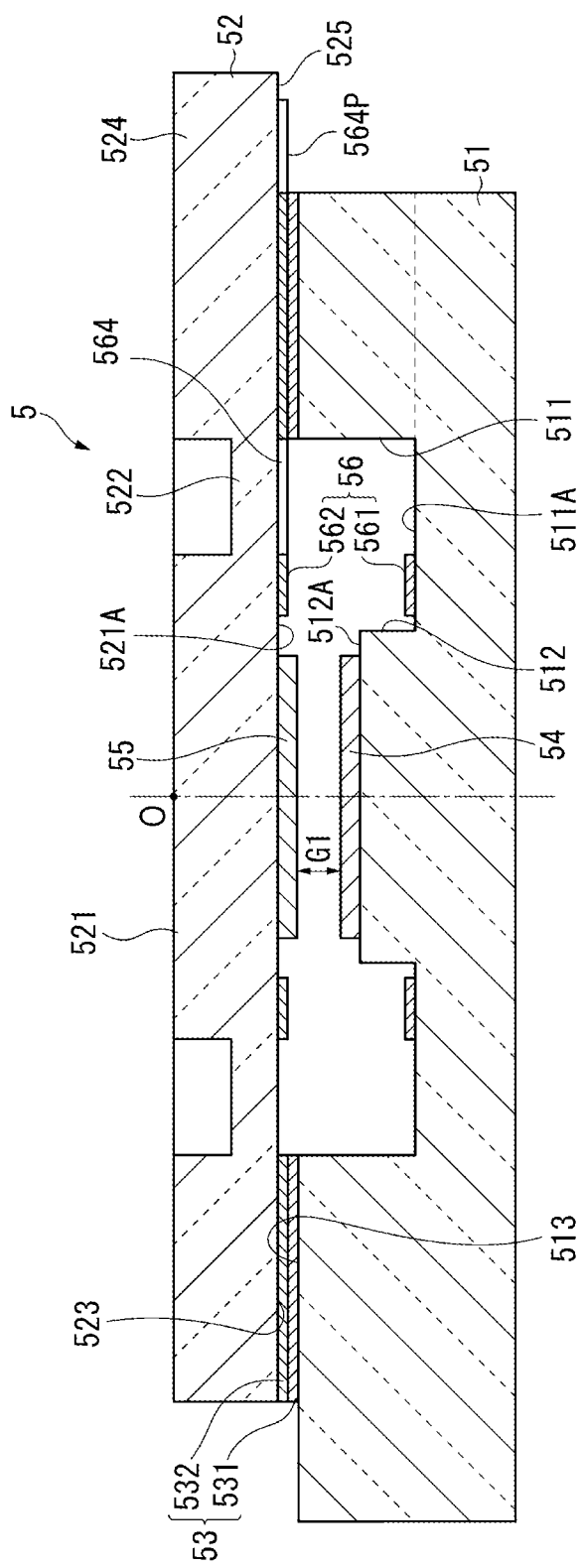
FIG. 3 is a sectional view illustrating the schematic configuration of the wavelength variable interference filter taken along line III-III in FIG. 2.

Configuration of the Wavelength Variable Interference Filter in the Light Receiving Section FIG. 2 is a plan view of a schematic configuration of the wavelength variable interference filter 5. FIG. 3 is a sectional view illustrating the schematic configuration of the wavelength variable interference filter 5 taken along line III-III in FIG. 2.

The wavelength variable interference filter 5 corresponds to a spectroscope in the invention, and includes a fixed substrate 51 and a movable substrate 52 as illustrated in FIG. 2 and FIG. 3. The fixed substrate 51 and movable substrate 52 are respectively formed from, for example, various types of glass or crystal, and is assumed be formed from quartz glass in this embodiment. The substrates 51 and 52 are integrally configured by being bonded by a bonding film 53 (first bonding film 531 and second bonding film 532) as illustrated in FIG. 3. Specifically, a first bonded portion 513 of the fixed substrate 51 and a second bonded portion 523 of the movable substrate 52 are bonded by the bonding film 53 formed from, for example, a plasma polymerization film containing siloxane as a main component.

In the description hereafter, a plan view seen from the substrate thickness direction of the substrate 51 or the movable substrate 52, that is, a plan view seeing the wavelength variable interference filter 5 from the stacking direction of the fixed substrate 51, bonding film 53 and the movable substrate 52 will be referred to as a filter plan view.

As illustrated in FIG. 3, a fixed reflection film 54 that configures one of a pair of reflection films in the invention is provided in the fixed substrate 51. In addition, a movable reflection film 55 that configures the other of a pair of reflection films in the invention is provided in the movable substrate 52. These fixed reflection film 54 and the movable reflection film 55 are disposed to face each other via a gap G1 between the reflection films.

The wavelength variable interference filter 5 is provided with an electrostatic actuator 56 that is used for adjusting a distance of the gap G1 (gap dimension) between the reflection films 54 and 55, and is a gap changing section in the invention. The electrostatic actuator 56 is configured to include a fixed electrode 561 provided on the fixed substrate 51 and a movable electrode 562 provided on the movable substrate 52, and each of the electrodes 561 and 562 faces each other. The fixed electrode 561 and the movable electrode 562 face each other via a gap between the electrodes. Here, the electrodes 561 and 562 may be configured to be directly provided on the substrate surface of the fixed substrate 51 and movable substrate 52 respectively, or may be configured to be provided via another film members.

In the present embodiment, the configuration of forming the gap G1 between the reflection films is smaller than the gap between the electrodes is illustrated. However, for example, depending on a wavelength region transmitting through the wavelength variable interference filter 5, the gap G1 between the reflection films may be formed to be greater than the gap between the electrodes.

In addition, in the filter plan view, one side of the movable substrate 52 (for example, the side C3-C4 in FIG. 2) protrudes to the outside of the side C3'-C4' of the fixed substrate 51. This protruding portion of the movable substrate 52 is an electrical equipment section 524 which is not bonded with the fixed substrate 51, and an exposed surface when seeing the wavelength variable interference filter 5 from the fixed substrate 51 side becomes an electrical surface 525 on which electrode pads 564P and 565P described below are provided.

Similarly, in the filter plan view, one side of the fixed substrate 51 (a side opposite to the electrical equipment section 524) protrudes to the outside of the movable substrate 52.

Configuration of the Fixed Substrate

An electrode arrangement groove 511 and a reflection film installation portion 512 are formed on the fixed substrate 51 by etching. The thickness dimension of the fixed substrate 51 is greater than that of the movable substrate 52. Therefore, there is no electrostatic attractive force when a voltage is applied between the fixed electrode 561 and the movable electrode 562 or a deflection of the fixed substrate 51 due to an internal stress in the fixed electrode 561.

The electrode arrangement groove 511 is formed in a ring shape with a filter center point of the fixed substrate 51 as a center in a filter plan view. The reflection film installation portion 512 is formed to protrude to the movable substrate 52 side from the center portion of the electrode arrangement groove 511. A groove bottom surface of the electrode arrangement groove 511 becomes an electrode arrangement surface 511A on which the fixed electrode 561 is arranged. In addition, a protrusion distal end surface of the reflection film installation portion 512 becomes a reflection film arrangement surface 512A.

The fixed electrode 561 configuring the electrostatic actuator 56 is provided on the electrode arrangement surface 511A. The fixed electrode 561 is provided on the region facing a below-described movable electrode 562 of the movable portion 521 among the electrode arrangement surface 511A. In addition, the configuration may be provided in such a manner that an insulation films is stacked on the fixed electrode 561 for ensuring the insulation between the fixed electrode 561 and the movable electrode 562.

A fixed extraction electrode 563 connected to an outer circumferential edge of the fixed electrode 561 is provided on the fixed substrate 51. The fixed extraction electrode 563 is provided along a connection electrode groove (not illustrated) formed toward the side C3'-C4' side (the electrical equipment section 524 side) from the electrode arrangement groove 511. A bump portion 565A protruding toward the movable substrate 52 side is provided in the connection electrode groove and the fixed extraction electrode 563 extends up to the bump portion 565A. The connection electrode groove abuts against and electrically connected to a fixed connection electrode 565 provided on the movable substrate 52 at the bump portion 565A. The fixed connection electrode 565 extends to the electrical surface 525 from the region facing the connection electrode groove, and configures a fixed electrode pad 565P on the electrical surface 525.

In the present embodiment, the configuration in which one fixed electrode 561 is provided on the electrode arrangement surface 511A is exemplified. However, for example, the configuration may in such a manner that two electrodes of concentric circles having filter center points as centers are provided (dual electrode configuration). In addition, a transparent electrode may be provided on the fixed reflection film 54, or a connection electrode may be formed between the fixed side electrical equipment section and the fixed reflection film 54 using the conductive fixed reflection film 54. In this case, the configuration may be provided in such a manner that a part of the fixed electrode 561 is cut out according to the position of the connection electrode.

As described above, the reflection film installation portion 512 is formed to be a substantially cylindrical shape having a diameter smaller than that of the electrode arrangement groove 511 coaxial with the electrode arrangement groove 511, and includes a reflection film arrangement surface 512A facing the movable substrate 52 of the reflection film installation portion 512.

As illustrated in FIG. 3, the fixed reflection film 54 is installed on the reflection film installation portion 512. For example, a metal film of Ag or an alloyed film of Ag alloy can be used as the fixed reflection film 54. In addition, for example, a dielectric multilayer film may be used in which high refractive layer is formed from $TiO_2$ and low refractive layer is formed from $SiO_2$. Furthermore, a reflection film obtained by stacking metal films (or alloyed films) on the dielectric multilayer film, a reflection film obtained by stacking dielectric multilayer films on the metal films (or alloyed films), and a reflection film obtained by stacking single-layer refractive layers ($TiO_2$ or $SiO_2$) and the metal films (or alloyed films) may be used.

In addition, an antireflection film may be formed on a position corresponding to the fixed reflection film 54 on a light incident surface (a surface where the fixed reflection film 54 is not provided) of the fixed substrate 51. The antireflection film can be formed by alternately stacking a low refractive index film and a high refractive index film, and decreases the reflectance of visible light on the surface of the fixed substrate 51 to increase the transmittance.

Among the surfaces facing the movable substrate 52 of the fixed substrate 51, the surface on which the electrode arrangement groove 511, the reflection film installation portion 512, and the connection electrode groove are not formed by etching configures the first bonded portion 513. A first bonding film 531 is provided on the first bonded portion 513, and the fixed substrate 51 and the movable substrate 52 are bonded to each other as described above by bonding the first bonding film 531 to a second bonding film 532 provided on the movable substrate 52.

Configuration of the Movable Substrate

The movable substrate 52 includes a cylindrical-shape movable portion 521 having a filter center point as a center, and a holding portion 522 that is coaxial with the movable portion 521 and holds the movable portion 521.

The movable portion 521 is formed to have a thickness dimension greater than that of the holding portion 522. The movable portion 521 is formed to have a diameter dimension greater than that of at least the outer circumferential edge of the reflection film arrangement surface 512A in a filter plan view. The movable electrode 562 and the movable reflection film 55 are provided on the movable portion 521.

Similarly to the fixed substrate 51, the antireflection film may be formed on the surface on the opposite side of the fixed substrate 51 of the movable portion 521. The antireflection film like this can be formed by alternately stacking the low refractive index film and the high refractive index film, and thus, it is possible to decrease the reflectance on the visible light on the surface of the movable substrate 52 to increase the transmittance.

The movable electrode 562 is formed in a manner of facing the fixed electrode 561 via the predetermined gap between the electrodes, and in a ring shape same as the shape of the fixed electrode 561. The movable electrode 562 configures the electrostatic actuator 56 together with the fixed electrode 561. In addition, a movable connection electrode 564 connected to the outer circumferential edge of the movable electrode 562 is provided on the movable substrate 52. The movable connection electrode 564 is provided over the electrical surface 525 from the movable portion 521 along a position facing the connection electrode groove (not illustrated) provided on the fixed substrate 51, and configures a movable electrode pad 564P on the electrical surface 525.

In addition, as described above, the fixed connection electrode 565 is provided on the movable substrate 52, and the fixed connection electrode 565 is connected to the fixed extraction electrode 563 via the bump portion 565A (refer to FIG. 2).

The movable reflection film 55 is provided at the center portion of a movable surface 521A of the movable portion 521 while facing the fixed reflection film 54 via a gap G1. The reflection film having a configuration same to that of the fixed reflection film 54 is used as the movable reflection film 55.

In the present embodiment, the example is described as above in which the gap between the electrodes is greater than the dimension of the gap G1 between the reflection films, but not limited thereto. For example, depending on the target wavelength range for acquiring the spectral image such cases as using infrared or far infrared ray, the configuration may be provided in such a manner that the dimension of the gap G1 is greater than the dimension of the gap between the electrodes.

The holding portion 522 is a diaphragm that surrounds the periphery of the movable portion 521, and is formed such that the thickness dimension is smaller than that of the movable portion 521. The holding portion 522 like this more easily deflected than the movable portion 521, and thus, it is possible to displace the movable portion 521 to the fixed substrate 51 side using a slight electrostatic attractive force. At this time, since the thickness dimension of the movable portion 521 is greater than that of the holding portion 522 and the rigidity thereof increases, even in a case where the holding portion 522 is pulled to the fixed substrate 51 side due to the electrostatic attractive force, the shape of the movable portion 521 is not changed. Therefore, the movable reflection film 55 provided on the movable portion 521 does not deflected, and thus, it is possible to always maintain the state of the fixed reflection film 54 and the movable reflection film 55 to be parallel.

In the present embodiment, the diaphragm-shaped holding portion 522 is described as an example, but not limited thereto. For example, the configuration may be provided in such a manner that, beam-shaped holding portions arranged in equal angular intervals with the filter center point as a center, is provided.

On the movable substrate 52, the region facing the first bonded portion 513 is the second bonded portion 523. The second bonding film 532 is provided on this second bonded portion 523, and as described above, the fixed substrate 51 and the movable substrate 52 are bonded to each other by bonding the second bonding film 532 to the first bonding film 531.

Configuration of the Imaging Element in the Light Receiving Section

Figure 4:
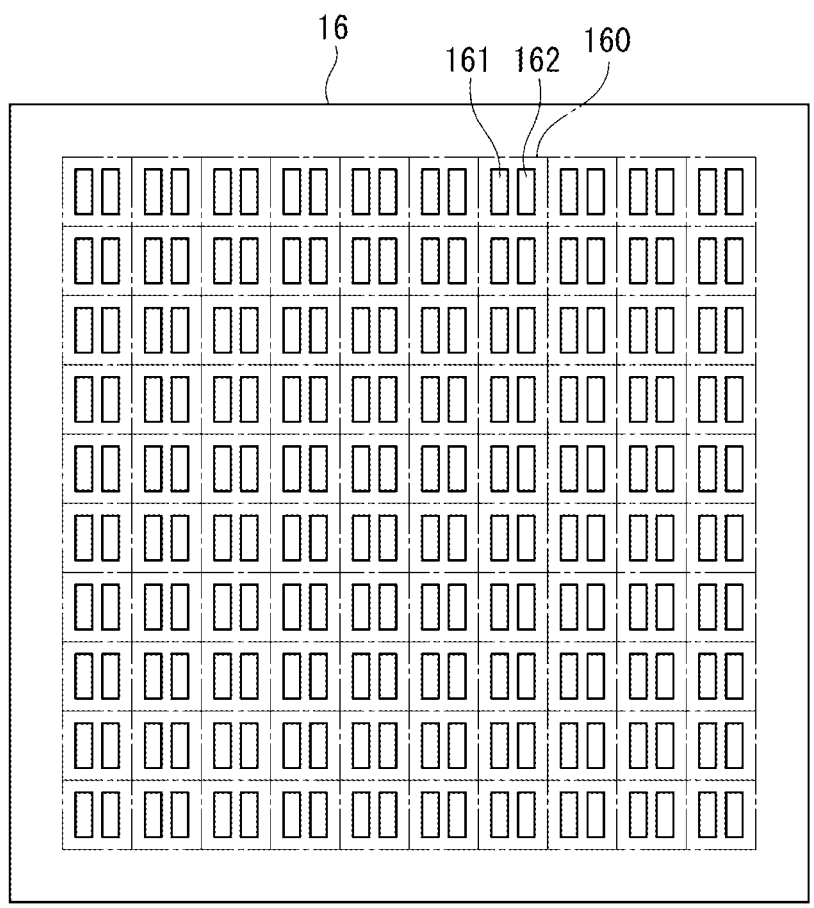
FIG. 4 is a plan view schematically illustrating imaging elements illustrated in FIG. 1.

FIG. 4 is a plan view schematically illustrating imaging elements 16 illustrated.

As illustrated in FIG. 1, the imaging element 16 receives (detects) the light transmitted through the wavelength variable interference filter 5, and outputs the detection signal based on the amount of received light to the signal processing circuit 13. As illustrated in FIG. 4, the imaging element 16 includes a plurality of pixels 160 that is configured to include a first light receiving element 161 and a second light receiving element 162. A plurality of pixels 160 is arranged in two-dimensional array shape to configure the imaging element 16. The number of pixels 160 included in the imaging element 16 and the arrangement of the pixels 160 are not limited to the example illustrated.

The first light receiving element 161 and the second light receiving element 162 accumulate electric charges according to the exposure time length, and outputs the detection signal according to the accumulated electric charges to the signal processing circuit 13. These first light receiving element 161 and the second light receiving element 162 have substantially the same optical characteristics (light sensitivity), and are configured so as to be capable of outputting the detection signal corresponding to the exposure time lengths different from each other based on the control by the control section 30 as described below. That is, the first light receiving element 161 outputs the detection signal having a first output value corresponding to a first exposure time length based on the control by the control section 30. On the other hand, the second light receiving element 162 outputs the detection signal having a second output value which is greater than the first output value, that is, the second output value corresponding to the second exposure time length which is longer than the first exposure time length based on the control by the control section 30.

Various image sensors such as a CCD or a CMOS can be used as the imaging element 16.

Configuration of a Signal Processing Circuit, Voltage Control Circuit, and Light Source Control Circuit The signal processing circuit 13 causes the imaging element 16 to output the detection signal based on a control signal from the control section 30. In addition, the signal processing circuit 13 amplifies the detection signal (analog signal) output from the imaging element 16, and then, converts the amplified signal to a digital signal to output to the control section 30. The signal processing circuit 13 is configured to include an amplifier that amplifies the detection signal and an A/D converter that converts the analog signal to the digital signal.

The signal processing circuit 13 converts the analog signal (for example, the voltage value) output from each light receiving elements 161 and 162 in the imaging element 16 to the digital signal having a predetermined number of bits (in the present embodiment, 1024 gradations in 10 bits) set based on the dynamic ranges of the light receiving elements 161 and 162, and then, outputs the digital signal to the control section 30 as the output values of each light receiving elements 161 and 162.

The voltage control circuit 14 applies a drive voltage to the electrostatic actuator 56 in the wavelength variable interference filter 5 based on the control by the control section 30. In this way, the electrostatic attractive force is generated between the fixed electrode 561 and the movable electrode 562 of the electrostatic actuator 56, and thus, the movable portion 521 deflects toward the fixed substrate 51 side.

The light source control circuit 15 controls the drive voltage applied to the light source section 11 to adjust the amount of light emitted from the light source section 11. Under the control by the control section 30, the light source control circuit 15 executes a control of lighting the light source section 11 or adjustment of the amount of light at a predetermined timing.

Configuration of the Display Section and the Operation Section

The display section 21 is configured to include various display devices such as a liquid crystal display, a plasma display panel (PDP), or an organic EL display panel. The display section 21 displays the results of measuring the color or the captured image based on the control by the control section 30.

The operation section 22 is configured to include various devices that can detect the user's operation such as a mouse, a keyboard, a touch panel.

Configuration of the Control Section

Next, the control section 30 of the color measuring device 1 will be described.

The control section 30 is configured by a combination of a CPU and memory and the like, and controls the overall operations of the color measuring device 1. The control section 30 includes a storage section 31 and a processing section 32 as illustrated in FIG. 1.

The storage section 31 stores various programs and various data items for controlling the color measuring device 1. The data items include, for example, V-λ data indicating a ratio of a wavelength of the transmitted light to the drive voltage applied to the electrostatic actuator 56, or information (a measurement starting wavelength, a change interval of the wavelength, or a measurement ending wavelength, the like) relating to the measuring wavelength when measuring the measuring object X.

As illustrated in FIG. 1, the processing section 32 functions as a filter control section 321, a light source control section 322, a light reception control section 323, a weighted composition section 324, a color measuring control section 325, and the like by reading and executing the various programs stored in the storage section 31.

In the present embodiment, an example is described in which the processing section 32 reads and executes the program (software) stored in the storage section 31, and then, the above-described functions is realized by a cooperation of the software and the hardware, but is not limited thereto. For example, the configuration may be provided in such a manner that a circuit as hardware having such functions is provided.

The filter control section 321 sets a target wavelength of the light extracted from the wavelength variable interference filter 5, and outputs a command signal to the voltage control circuit 14 so as to apply the drive voltage corresponding to the set target wavelength to the electrostatic actuator 56 based on the V-λ data.

The light source control section 322 controls the light source control circuit 15 to apply the drive voltage to the light source section 11 at the predetermined timing such as a time of color measuring, and lights the light source section 11.

The light reception control section 323 controls the imaging element 16 and acquires the first spectral image and the second spectral image. In the present embodiment, the light reception control section 323 causes the first light receiving elements 161 of each of the plurality of pixels 160 to output the detection signal corresponding to the first exposure time length and acquires the first spectral image corresponding to the first exposure time length. In addition, the light reception control section 323 causes the second light receiving element 162 of each of the plurality of pixels 160 to output the detection signal corresponding to the second exposure time length which is longer than the first exposure time length, and acquires the second spectral image corresponding to the second exposure time length. Among the first light receiving element 161 and the second light receiving element 162 configuring each of the pixels 160, the second output value from the second light receiving element 162 corresponding to the second exposure time length is greater than the second output value from the first light receiving element 161 corresponding to the first exposure time length. That is, in the output values of the pixels 160 corresponding to the first spectral image and the second spectral image, the second output value in the second spectral image of which the exposure time length is long is greater than the first output value in the first spectral image.

The weighted composition section 324 performs a weighted composition on the spectral images of each wavelength in the measurement target wavelength using the first output value and the second output value for each pixel 160, and then, generates a composite spectral image. That is, the weighted composition section 324 composes the first output value and the second output value for each pixel 160 for each wavelength and calculates a reflectance (composite reflectance) as the obtained composite value, and then, generates the composite spectral image. The processing by the weighted composition section 324 will be described below.

The color measuring control section 325 calculates the result of color measurement in the imaging range using the composite spectral images for 16 bands generated by the weighted composition section 324, and then, stores the result of color measurement in the storage section. Here, the result of color measurement is, for example, the spectrum of each pixel estimated based on the reflectance of bands of each pixel in the imaging range, a color measurement value of each pixel acquired based on the spectrum of each pixel, or the like. In addition, the color measurement value is a numerical value indicating a color of the pixel such as a color value calculated based on various expression methods such as an L*a*b* color system or an XYZ color system and a difference of the color of another pixel with respect to a reference pixel. Other than the color measurement value of each pixel, the color measurement value may be a color measurement value obtained averaging the color measurement values of all the pixels in the imaging range.

Color Measuring Method in the Color Measuring Device

Next, hereinafter, a color measuring method using the measuring method in the invention will be described as an example of the operation of the color measuring device 1 described above based on the drawings.

Figure 5:
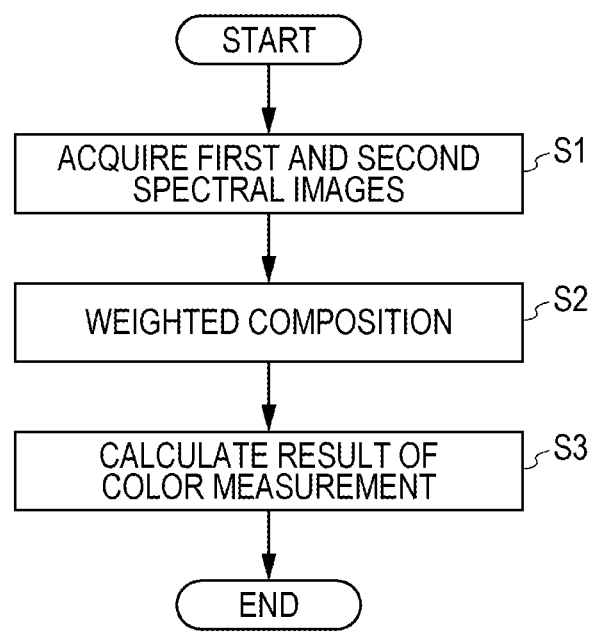
FIG. 5 is a flowchart illustrating a color measuring method in the color measuring device in the first embodiment.

FIG. 5 is a flowchart illustrating the color measuring method in the present embodiment.

As illustrated in FIG. 5, the color measuring device 1 acquires the first spectral image corresponding to the first output value of the first light receiving element 161 and the second spectral image corresponding to the second output value from the second light receiving element 162 for each of the predetermined measurement wavelengths, and executes the weighted composition processing on the first spectral image and the second spectral image for one wavelength. In addition, the color measuring device 1 calculates the color measurement values in the imaging range based on the result of composition.

Spectral Image Acquisition Processing

In the color measuring device 1 in the present embodiment, when an instruction to start the color measurement processing is input by an operator's operation of the operation section 22, as illustrated in FIG. 5, the light source control section 322 lights the light source section 11, and then, the filter control section 321 controls the voltage control circuit 14 to sequentially apply the drive voltages corresponding to each wavelengths of a predetermined interval (for example, interval of 20 nm) in the predetermined measurement target wavelength band (for example, a visible light band) to the electrostatic actuator 56, and then, sets the wavelength of the light transmitted through the wavelength variable interference filter 5 as the measurement wavelength. Then, the first spectral image and the second spectral image of each wavelength imaged by the imaging element 16 are acquired (STEP S1). For example, in a case of acquiring the spectral images for the measurement target wavelengths of 400 nm to 700 nm with an interval of 20 nm, the spectral images for 16 wavelengths are acquired.

Specifically, the filter control section 321 sets the wavelength of the light transmitted through the wavelength variable interference filter 5 to be any one of the wavelength among the 16 measurement wavelengths described above. After resetting the accumulated electric charges in the imaging element 16, the light reception control section 323 causes the imaging element 16 to start exposing, and causes the first light receiving element 161 of each pixel 160 to output the first output value (for example, the voltage value) in accordance with the exposure amount at the timing when the first exposure time length elapsed, and then, acquires the first output value corresponding to the exposure amount via the signal processing circuit 13. The light reception control section 323 stores the first output value of each pixel 160 in the storage section 31 in association with the pixel position and the measurement wavelength, and then, acquires the first spectral image of the set measurement wavelength.

In addition, the light reception control section 323 causes the second light receiving element 162 of each pixel 160 to output the second output value (for example, the voltage value) in accordance with the exposure amount at the timing when the second exposure time length elapsed from the exposure starting time, and then, acquires the second output value corresponding to the exposure amount via the signal processing circuit 13. The light reception control section 323 stores the second output value of each pixel 160 in the storage section 31 in association with the pixel position and the measurement wavelength, and then, acquires the second spectral image of the set measurement wavelength.

In STEP S1, the first spectral image and the second spectral image described above are acquired for each of the 16 measurement wavelengths.

In the present embodiment, the first output value and the second output value acquired by the light reception control section 323 are 10 bit digital signals corresponding to the exposure amount as described above. In addition, the output values vary between values zero to 1023. A maximum output value Dmax in a case where the exposure amount reaches the upper limit value of the dynamic ranges of each light receiving elements 161 and 162 is 1023.

Figure 6A:
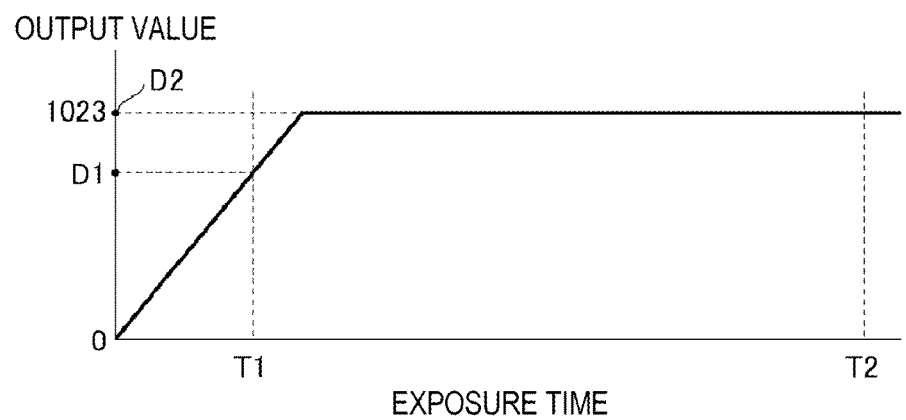
FIG. 6A and FIG. 6B are diagrams illustrating an example of a first output value corresponding to a first exposure time length and a second output value corresponding to a second exposure time length in the first embodiment.
Figure 6B:
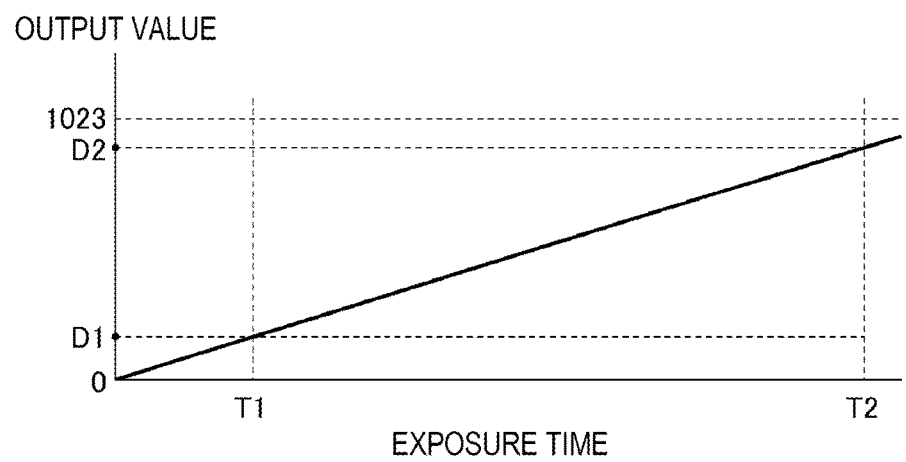

Relationship Between the Output Value of the Light Receiving Element and the Exposure Time Length FIG. 6A and FIG. 6B are diagrams illustrating the example of the first output value D1 corresponding to the first exposure time length T1 and the second output value D2 corresponding to the second exposure time length T2. FIG. 6A illustrates a case where the light is received from the comparatively high reflectance region in the measuring object X and FIG. 6B illustrates a case where the light is received from the comparatively low reflectance region in the measuring object X.

As illustrated in FIG. 6A, in a case where the light is received from the high reflectance region, that is, the high brightness region, the output value reaches the upper limit value of the dynamic range of the imaging element 16, and thus, there is a case where the amount of received light in the second light receiving element 162 exceeds the allowable value. Even in such a case, as illustrated in FIG. 6A, it is possible to suppress both the output values D1 and D2 from becoming the upper limit value by setting the short first exposure time length T1 to be equal to or shorter than a threshold value such that the first output value D1 becomes a value lower than the upper limit value of the dynamic range of the imaging element 16.

In addition, as illustrated in FIG. 6B, in a case where the light is received from the low reflectance region, that is, the low brightness region, any of the output values D1 and D2 do not reach the upper limit value of the dynamic range of the imaging element 16, and then, since the first output value D1 corresponding to the first exposure time length T1 becomes small, there is a case where the sufficient exposure amount cannot be obtained in view of the sensitivity of the imaging element 16, and thus, the SN ratio deteriorates. Even in such a case, as illustrated in FIG. 6B, it is possible to suppress the SN ratio from becoming less than the allowable value in both the output values D1 and D2 by setting the second exposure time length T2 to be equal to or longer than the threshold value such that the SN ratio of the second output value D2 becomes the allowable value.

Furthermore, it is preferable that the first exposure time length T1 and the second exposure time length T2 are appropriately set such that the first output value D1 reaches the upper limit value and second output value D2 does not become less than the allowable value.

Weighted Composition Processing

Next, the weighted composition section 324 executes weighted composition processing using the acquired first spectral image and the second spectral image (STEP S2).

The weighted composition section 324 performs weighted composition (refer to Equation (5)) on each of the first output value D1 and second output value D2 of one pixel in the first spectral image and the second spectral image acquired for one wavelength using a weight value (refer to Equation (3) for the first weight value W1 for the first output value D1 and refer to Equation (4) for the second weight value W2 for the second output value D2) corresponding to the second output value D2, and then, calculates a composite reflectance $R_{HDR}$. The weighted composition section 324 generates a composite spectral image as a result of the weighted composition processing on the first spectral image and the second spectral image by calculating the composite reflectance $R_{HDR}$ for each pixel 160. The weighted composition section 324 executes the weighted composition processing for all the measurement wavelengths (in the present embodiment, 16 wavelengths) and generates the composite spectral images.

$$W1 = \left(\frac{D2}{D\max}\right)^2 \quad (3)$$

$$W2 = 1 - \left(\frac{D2}{D\max}\right)^2 \quad (4)$$

$$R_{HDR} = \frac{D1}{Dref1} \times W1 + \frac{D2}{Dref2} \times W2 \quad (5)$$

Here, in the present embodiment, as indicated in Equation (5), the composite reflectance $R_{HDR}$ is calculated by performing a weighted adding each reflectance value by dividing the first output value D1 by a corresponding first reference value Dref1 and dividing the second output value D2 by a corresponding second reference value Dref2. The first reference value Dref1 is, for example, an output value from the first light receiving element 161 obtainable in measuring a white reference object and the second reference value Dref2 is an output value from the second light receiving element 162 obtainable by a similar method. These reference values Dref1 and Dref2 are acquired in advance and stored in the storage section 31.

The maximum output values Dmax in Equations (3) and (4) in the present embodiment is 1023. In addition, Equation (1) can be obtained by respectively substituting the Equations (3) and (4) for the first weight value W1 and the second weight value W2 in Equation (5) described above.

Figure 7:
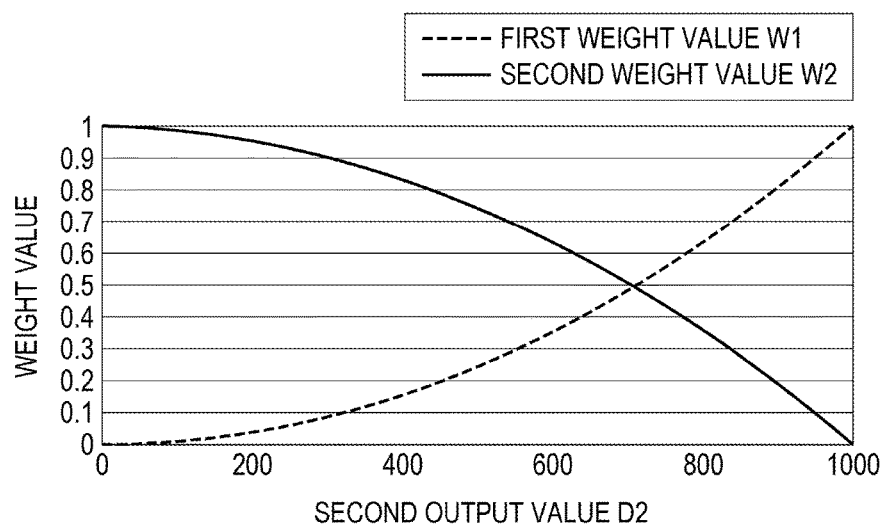
FIG. 7 is a graph illustrating an example of a relationship between the second output value, and the first weight value and the second weight value in the first embodiment.

FIG. 7 is a graph indicating the second output value D2 on the horizontal axis and each of the weight values W1 and W2 on the vertical axis.

As illustrated in FIG. 7 and Equations (3) and (4), first weight value W1 and the second weight value W2 are the values of quadratic function of the second output values D2, the sum of the first weight value W1 and the second weight value W2 is a predetermined value (in the present embodiment, one). In addition, the first weight value W1 increases and the second weight value W2 decreases in accordance with the increase of second output value D2 to the long exposure time side. In addition, the second weight value W2 becomes a maximum value when the second output value D2 is zero which is the lower limit value, and becomes zero when the second output value D2 is 1023 which is the upper limit value. In this way, it is possible to make the second weight value W2 gradually decrease until the output value of the second output value D2 in the long exposure time side reaches the upper limit value. In addition, in a case where the output values of the second output value D2 is the upper limit value, it is possible to expand the upper limit of the dynamic range by making the second weight value W2 be zero and making the first weight value W1 of the first output value D1 be one. In addition, by setting the second weight value W2 to be the maximum value when the second output value D2 is zero, it is possible to set the second weight value W2 to be greater in the region where the amount of received light is in the low brightness side of the dynamic range than that in a case where the second weight value W2 is not set to the maximum value when the second output value D2 is zero. Therefore, in the low brightness side, the rate of the second output value D2 at the long exposure time can be made to be greater than that of the first output value D1, and thus, it is possible to surely improve the SN ratio.

Calculation of the Results of Color Measurement

Next, the color measuring control section 325 calculates the results of color measurement using the composite spectral image for 16 wavelengths acquired in STEP S2 (STEP S3).

That is, the color measuring control section 325 estimates the spectrum for each pixel using the reflectance of each pixel in the composite spectral images for 16 bands generated by the weighted composition section 324. Then, the color measuring control section 325 calculates the results of color measurement in the imaging range from the estimated spectrum and stores the results of color measurement in the storage section 31. Then, the control section 30 ends the color measurement processing in the flowchart.

Operational Effects of the First Embodiment

The color measuring device 1 includes the imaging element 16 in which one pixel is configured to include the first light receiving element 161 and the second light receiving element 162, and acquires the output values different from each other from the first light receiving element 161 and the second light receiving element 162 respectively when one measurement light is received. Then, the color measuring device 1 performs the weighted composition on the first output value D1 and the second output value D2 and calculates the composite reflectance $R_{HDR}$. The color measuring device 1 acquires the spectral image for all the measurement wavelengths by calculating the composite reflectance $R_{HDR}$ of the pixel 160 for each measurement wavelength.

As above, the composite reflectance $R_{HDR}$ is acquired by performing the weighted composition on the first output value D1 and the second output value D2. Thus, it is possible to acquire the composite reflectance $R_{HDR}$ in which the dynamic range is expanded.

In addition, the color measuring device 1 causes the first light receiving element 161 and the second light receiving element 162 to output the output values corresponding to the different exposure time lengths. That is, in the color measuring device 1, it is possible to acquire two different output values by making the exposure time length of the two light receiving elements that receives the same measurement light be different. Therefore, it is possible to suppress the increase of the manufacturing cost compared to the case of using the non-destructive readable imaging element that can acquire the output values corresponding to the different exposure time lengths (exposure amount) from one light receiving element.

The color measuring device 1 performs the weighted composition on the first output value D1 and the second output value D2 based on the second output value D2 of the second light receiving element 162 which has a higher output power than the first light receiving element 161. Here, in the present embodiment, the exposure time length in second light receiving element 162 is set longer than in the first light receiving element 161, and thus, it is possible to detect the amount of light of the measurement light from the low brightness region of the measuring object X with a high accuracy. On the other hand, since the exposure amount of the measurement light from the high brightness region of the measuring object X in the second light receiving element 162 is more easily saturated than that in the first light receiving element 161, there is a possibility that the amount of light cannot be detected with a high accuracy. Accordingly, by performing the weighted composition with the output value from the second light receiving element 162 which is easily saturated as a reference, the weighted composition can be appropriately performed. Therefore, it is possible to suppress the decrease of the detection accuracy and to expand the dynamic range.

In addition, the color measuring device 1 increases the first weight value W1 and decreases the second weight value W2 in accordance with the increase of the second output value D2. In this way, in a case of measuring the measurement light from the low brightness region, the second output value D2 of the second light receiving element 162 which can detect the amount of light in the low brightness region with a higher accuracy can be comparatively smaller value. Therefore, it is possible to increase the weight of the second output value D2. On the other hand, in a case of measuring the measurement light from the high brightness region, the second weight value W2 of the second light receiving element 162 which is easily saturated can be decreased. Therefore, it is possible to suppress the decrease of the detection accuracy due to the saturation of the second light receiving element 162. Therefore, it is possible to expand the dynamic range and improve the accuracy of detecting the amount of light.

In addition, in a case where the second output value D2 is the maximum output values Dmax, the color measuring device 1 makes the second weight value W2 to be zero. In this way, the second output value D2 in which the exposure amount of the second light receiving element 162 is easily saturated and the accuracy of detecting the amount of light may possibly decrease is not used for the weighted composition. Therefore, an appropriate composite value can be calculated.

The color measuring device 1 sets the values of quadratic function of the second output value which becomes maximum value at the point where the second output value D2 becomes the low limit value zero as the second weight value W2. The first weight value W1 becomes minimum value at the point where the second output value D2 becomes lower limit value zero. In this way, in the vicinity of the lower limit value of the second output value D2, it is possible to reduce the decreased amount of the second weight value W2 in accordance with the increase of the second output value D2 compared to the case of decreasing the second weight value W2 so as to be proportional to the increase of the second output value D2. Therefore, in the low brightness region, the weight value of the second output value D2 can be increased, and thus, it is possible to improve the accuracy of detecting the amount of light.

In addition, the color measuring device 1 can calculate the composite reflectance $R_{HDR}$ using the first output value D1 and the second output value D2 and Equation (1) described above (or Equations (3) to (5) described above).

Here, in the color measuring device 1, each pixel 160 is configured to include the first light receiving element 161 and the second light receiving element 162. In the configuration described above, the composite value is calculated by performing the weighted composition on the first output value and the second output value for each pixel, and the composite image in which the dynamic range is expanded can be generated based on the composite value of each pixel. Furthermore, color measuring device 1 includes the wavelength variable interference filter 5 and can acquire the composite spectral image as the composite image. The color measuring device 1 can acquire the results of color measurement with a high accuracy in the imaging range by acquiring the composite spectral images for a plurality of wavelengths (for example, for 16 wavelengths).

Second Embodiment

Next, a second embodiment in the invention will be described.

In the first embodiment described above, the configuration is illustrated in which the weighted composition section 324 sets the first weight value W1 that increase and the second weight value W2 that decreases in accordance with the increase of the second output value D2 over the entire variation range of the second output value D2. In addition, the configuration is illustrated in which the weighted composition section 324 sets each of the weight values W1 and W2 as the value of quadratic function of the second output value D2.

On the contrary, the second embodiment is basically similar to the first embodiment except the point that the content of the weighted composition processing by the weighted composition section 324 is different from that in the first embodiment. That is, in a range where the second output value D2 is equal to or greater than the predetermined first threshold value d1 and equal to or smaller than the second threshold value d2, the weighted composition section 324 sets the first weight value W1 which increases in accordance with the increase of the second output value D2 and the second weight value W2 which decreases in accordance with the increase of the second output value D2. In addition, the weighted composition section 324 sets each of the weight value W1 and W2 as a value of a cubic function of the second output value D2.

Hereinafter, details of the weighted composition processing by the weighted composition section 324 will be described. In the description below, the same reference numerals will be given to the configurations same as that in the first embodiment, and the description thereof will be omitted or simply described.

Weighted Composition Processing

Figure 8:
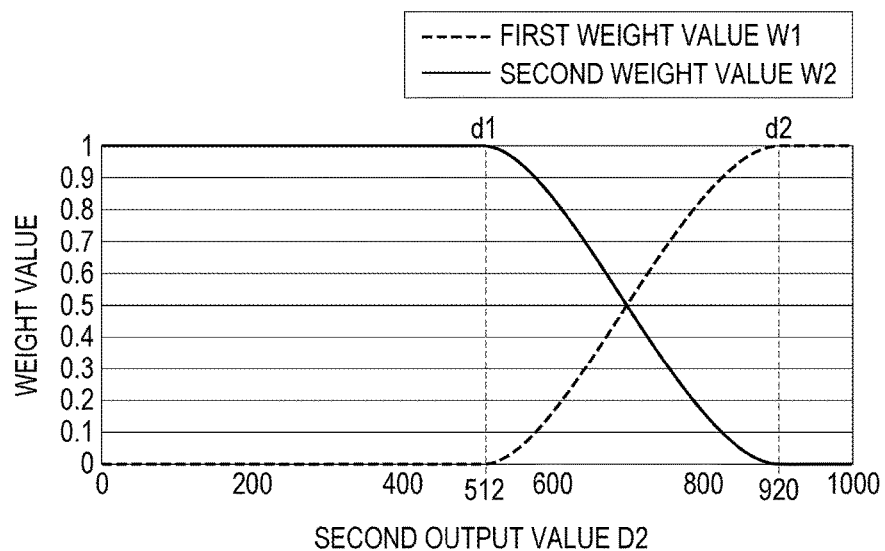
FIG. 8 is a graph illustrating an example of a relationship between a second output value, and a first weight value and a second weight value in a second embodiment of the invention.

FIG. 8 is a graph indicating the second output value D2 on the horizontal axis and each of the weight values W1 and W2 on the vertical axis.

As illustrated in FIG. 8, the weighted composition section 324 sets the first weight value W1 to zero when the second output value D2 is in the range of being smaller than the first threshold value d1, and sets the second weight value to be the predetermined value one (refer to Equation (6) described below).

In addition, in the range where the second output value D2 is equal to or greater than the first threshold value d1 and smaller than the second threshold value d2, the weighted composition section 324 sets the first weight value W1 (refer to Equation (7) below) and the second weight value W2 (refer to Equation (8) described below) according to the second output value D2. Specifically, the first weight value W1 and the second weight value W2 are values of the cubic function of the second output value D2 and the sum of the first weight value W1 and the second weight value W2 is a predetermined value (in the present embodiment, it is one). In addition, the second output value D2 has a maximum value in a case where the second output value D2 is the first threshold value d1, and has a minimum value in a case where the second output value D2 is the second threshold value d2. Conversely, the first output value D1 has a minimum value in a case where the second output value D2 is the first threshold value d1, and has the maximum value in a case where the second output value D2 is the second threshold value d2.

In addition, in the present embodiment, in the range where the second output value D2 exceeds the second threshold value d2, the first weight value W1 is set to one (first value), and the second weight value set to zero (second value) which a predetermined value (refer to Equation (9) described below). The first value and the second value are not limited to the values set as described above as long as they are set to predetermined values.

Equation (2) can be obtained by respectively substituting Equations (7) and (8) describe above for the first weight value W1 and the second weight value W2 in Equation (5) described above.

$$(D2 < d1)$$

$$W1 = 0, W2 = 1 \quad (6)$$

$$(d1 \leq D2 \leq d2)$$

$$W1 = -2 \times \left(\frac{D2 - d1}{d2 - d1}\right)^3 + 3 \times \left(\frac{D2 - d1}{d2 - d1}\right)^2 \quad (7)$$

$$W2 = -2 \times \left(\frac{D2 - d1}{d2 - d1}\right)^3 - 3 \times \left(\frac{D2 - d1}{d2 - d1}\right)^2 + 1 \quad (8)$$

$$(d2 < D2)$$

$$W1 = 1, W2 = 0 \quad (9)$$

Here, the first threshold value d1 is appropriately set to, for example, a value that makes the accuracy of detecting the amount of received light (for example, the SN ratio) by the first light receiving element 161 of which the exposure time length is short becomes equal to or greater than the allowable value in accordance with the light sensitivity of each light receiving elements 161 and 162 or each exposure time lengths T1 and T2. In this way, it is possible to calculate the composite reflectance $R_{HDR}$ with a high accuracy.

In addition, the second threshold value d2 is appropriately set in such a manner that, for example, the exposure amount of the second light receiving element 162 of which the exposure time length is long approaches the upper limit value and the detection accuracy does not become lower than the allowable value, that is for example, becomes the maximum value in the range of the allowable value, in accordance with the light sensitivity of the second light receiving element 162 or the exposure time length T2. In this way, it is possible to calculate the composite reflectance $R_{HDR}$ with a high accuracy.

In the present embodiment, the first threshold value d1 is set to 512 and the second threshold value d2 is set to 920.

The first weight value W1 in this case is indicated in Equation (10) and the second weight value W2 is indicated in Equation (11).

$$(d1 = 512, d2 = 920)$$

$$W1 = -2 \times \left(\frac{D2 - 512}{408}\right)^3 + 3 \times \left(\frac{D2 - 512}{408}\right)^2 \quad (10)$$

$$W2 = 2 \times \left(\frac{D2 - 512}{408}\right)^3 - 3 \times \left(\frac{D2 - 512}{408}\right)^2 + 1 \quad (11)$$

Operational Effects of the Second Embodiment

From the color measuring device in the present embodiment, operation effects described below can be obtained in addition to the operational effects same to that in the first embodiment.

In the color measuring device, in a case where the second output value D2 is smaller than the first threshold value d1, the second weight value W2 of the second light receiving element 162 which can detect the amount of light with a high accuracy is set to one (maximum value) in the low brightness region and the weight of the second output value D2 is made to be maximum, and in a case where the second output value D2 exceeds the second threshold value d2, the first output value from the first light receiving element which can detect the amount of light in the high brightness region with a high accuracy is adopted without using the second output value. In this way, the dynamic range can be expanded and it is possible to improve the accuracy of detecting the amount of light.

In addition, in the range where the second output value D2 is smaller than the first threshold value d1, the calculation of the reflectance can be executed using only the second output value D2 of the second light receiving element 162 by providing the first threshold value d1. Therefore, even if an error occurs due to the composition of the first output value D1 and the second output value D2, it is possible to improve the accuracy of detecting the amount of light without being influenced by the error in the range where the second output value D2 is smaller than the first threshold value d1. In addition, each of the weight values W1 and W2 becomes a fixed value in a case where the second output value D2 is equal to or smaller than the first threshold value d1 and in a case where the second output value D2 exceeds the second threshold value d2. Therefore, it is possible to reduce the processing load in the weighted composition processing.

In the color measuring device in the present embodiment, the value of cubic function of the second output value D2 (refer to Equation (8) described above) which becomes maximum at the point of the first threshold value d1 and becomes minimum at the point of the second threshold value d2, is set to the second weight value W2.

By making the second weight value W2 maximum at the point of the first threshold value d1, the weight value of the second output value D2 can be made large in the low brightness region as similar to the case in the first embodiment, and thus, it is possible to improve the accuracy of detecting the amount of light.

In addition, it is possible to make the second weight value W2 gradually approach one (first value) in accordance with the second output value D2 going toward the first threshold value d1. Therefore, it is possible to make the second weight value W2 be a value of the function of the second output value D2 that makes a smooth connection at the point of the first threshold value d1. In this way, when performing the weighted composition, it is possible to suppress the composition value from being discontinuous or from rapidly changing due to the fact that the amount of variation of the second weight value W2 is large in the vicinity of the first threshold value d1.

In addition, even in the vicinity of the second threshold value d2, similarly to the first threshold value d1, it is possible to make the second weight value W2 gradually approach zero (second value) in accordance with the second output value D2 going toward the second threshold value d2. Therefore, it is possible to make the second weight value W2 be a value of the function of the second output value D2 that makes a smooth connection at the point of the second threshold value d2. In this way, when performing the weighted composition, it is possible to suppress the composition value from being discontinuous or from rapidly changing due to the fact that the amount of variation of the second weight value W2 is large in the vicinity of the second threshold value d2.

In addition, in the range where the second output value D2 is equal to or greater than the first threshold value d1 and smaller than the second threshold value d2, the color measuring device can calculate the composite reflectance $R_{HDR}$ using the first output value D1 and the second output value D2 and Equation (2) described above (or Equations (7) and (8)). In addition, it is possible to suppress the increase of the processing load of the composite processing by calculating the composite reflectance using the cubic function which is the polynomial function of the lowest-degree function having a maximum value and a minimum value.

Third Embodiment

Next, a third embodiment in the invention will be described.

In the first embodiment described above, each pixel 160 of the imaging element 16 is configured to include the first light receiving element 161 and the second light receiving element 162 having the same light sensitivity, and is configure to be able to acquire the output values having different sizes from the same measurement light by making the exposure time lengths of the light receiving elements 161 and 162 be different from each other. On the contrary, in the third embodiment, each pixel of the imaging element is configured to include a first light receiving element and a second light receiving element having the light sensitivities different from each other, and thus, the output values having different sizes are acquired from the same measurement light.

Figure 9:
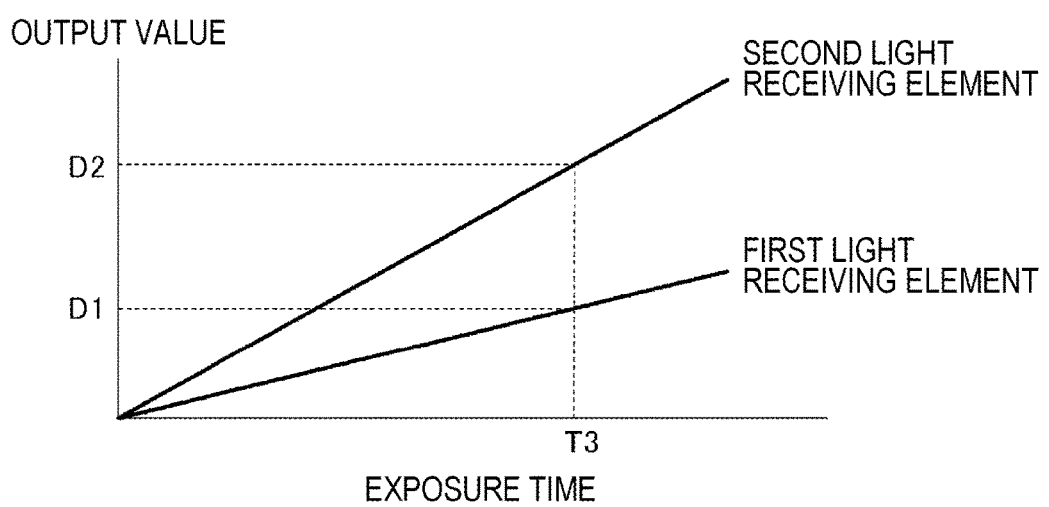
FIG. 9 is a diagram illustrating an example of a first output value and a second output value corresponding to the exposure time length in the third embodiment of the invention.

FIG. 9 is a graph illustrating the outputs of the first light receiving element and the second light receiving element that configure one pixel of the imaging element.

In a color measuring device in the present embodiment, each pixel includes an imaging element configured to include the first light receiving element and the second light receiving element having the light sensitivities different from each other as described above. In the present embodiment, the light sensitivity of the first light receiving element is lower than the light sensitivity of the second light receiving element.

At the timing when a predetermined exposure time length T3 has elapsed from the starting of exposure, the color measuring device outputs an output signal having the first output value D1 from the low-sensitivity first light receiving element and outputs an output signal having the second output value D2 from the high-sensitivity second light receiving element, respectively.

Even in the color measuring device in the present embodiment, similarly to the embodiments describe above, the first spectral image and the second spectral image can be acquired for each of entire measurement wavelengths. Then, the weighted composition of the first output value D1 and the second output value D2 is executed for each pixel of each measurement wavelengths, and the composite spectral image of each measurement wavelengths is acquired. The weighted composition processing is performed using any methods described in the first and the second embodiments.

Operational Effects of the Third Embodiment

The light sensitivities of the first light receiving element and the second light receiving element are different from each other. Therefore, it is possible to obtain a plurality of output values from one measurement light. As described above, by making the light sensitivity of one light receiving element be greater than that of the other light receiving element, the measurement light from the low brightness region in the measuring object can be exposed in a short exposure time using the high-sensitivity light receiving element compared to the case of acquiring the output values in accordance with the exposure time length using the light receiving elements having the same light sensitivity. Therefore, it is possible to shorten the exposure time length. In addition, the exposure amount can appropriately detected by exposing the measurement light from the low brightness region using the high-sensitivity light receiving element and by exposing the measurement light from the high brightness region using the low-sensitivity light receiving element, and thus, it is possible to expand the dynamic range.

Fourth Embodiment

Next, a fourth embodiment of the invention will be described.

In the fourth embodiment, a printer 60 (an ink jet printer) corresponding to the electronic apparatus in the invention will be described.

Schematic Configuration of the Printer

Figure 10:
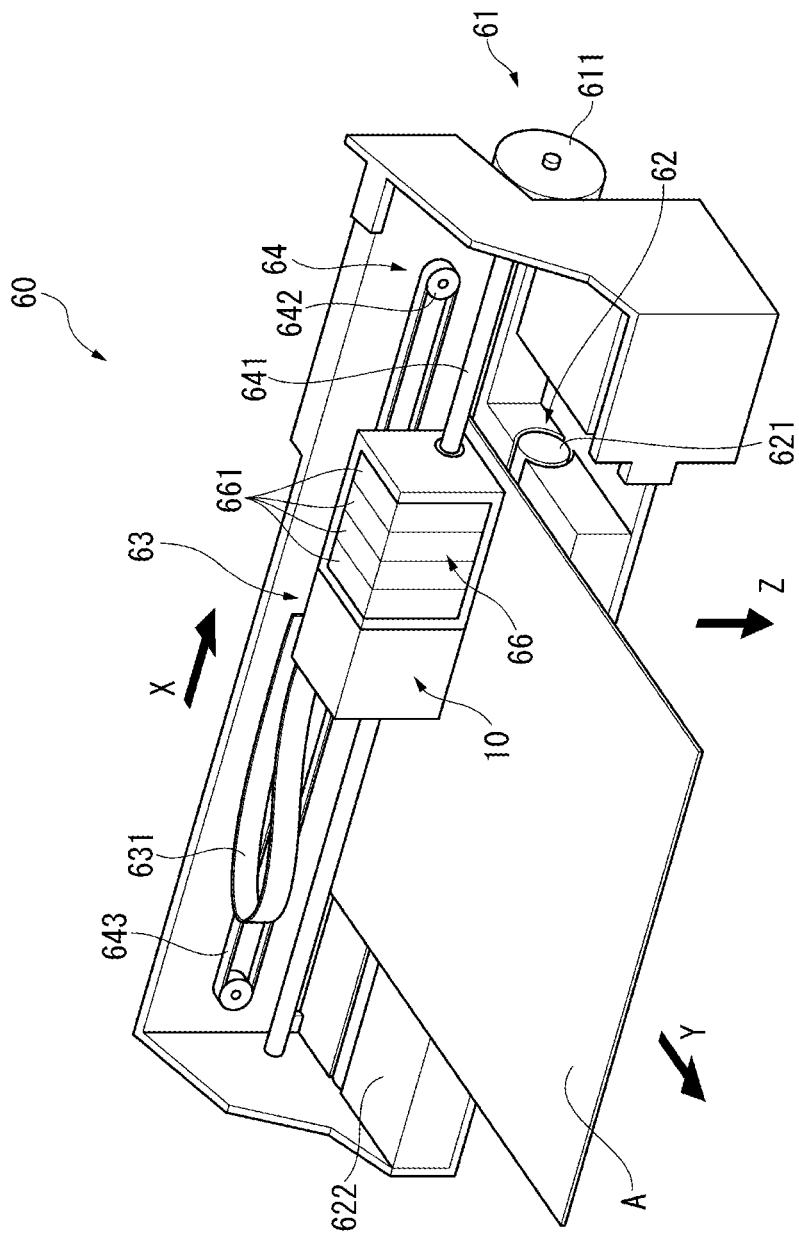
FIG. 10 is an external view illustrating a schematic configuration of a printer in a fourth embodiment of the invention.
Figure 11:
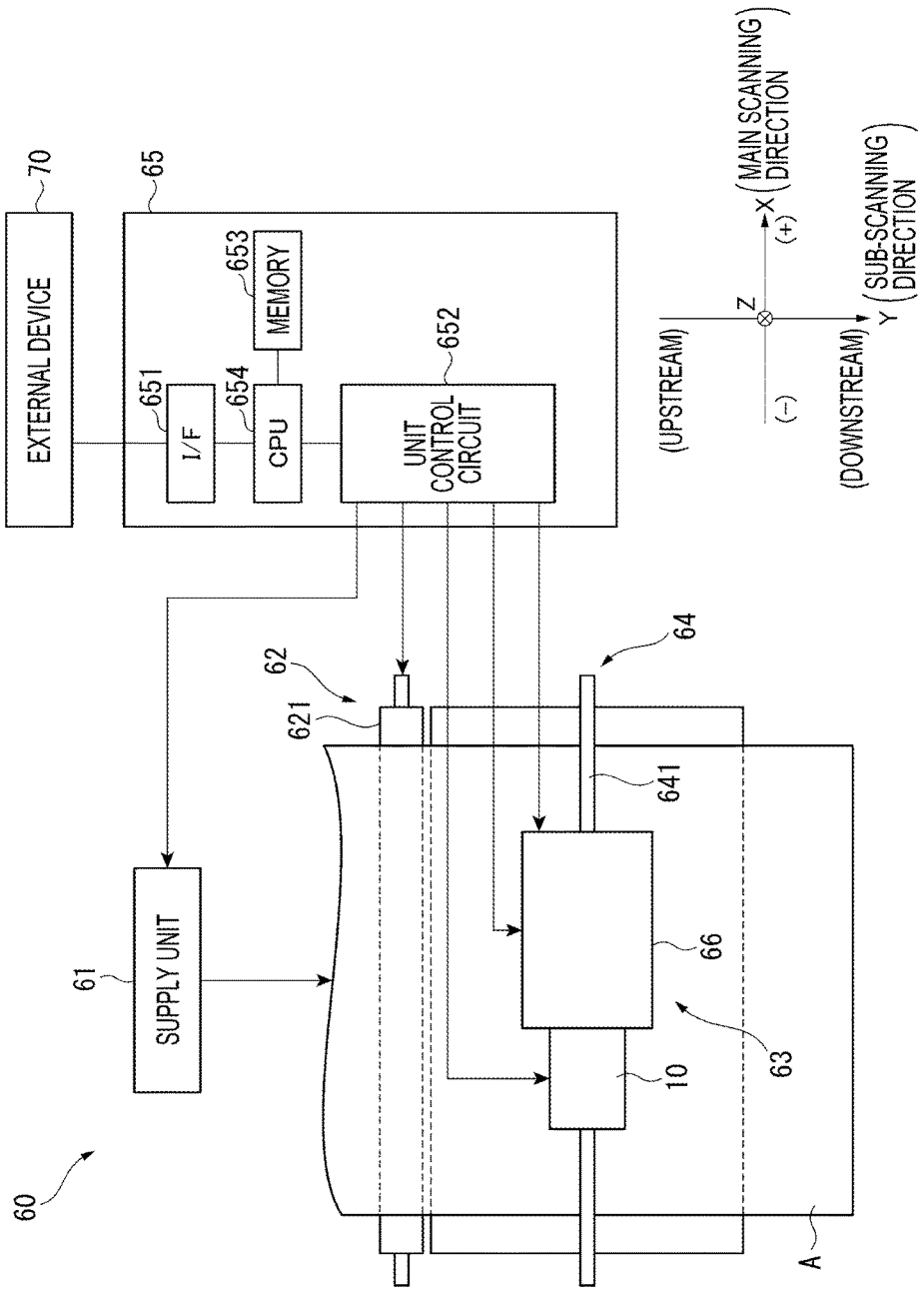
FIG. 11 is a block diagram illustrating a schematic configuration of the printer in the fourth embodiment.

FIG. 10 is a diagram illustrating an example of external configuration of the printer 60 in the fourth embodiment. FIG. 11 is a block diagram illustrating a schematic configuration of the printer 60 in the present embodiment.

As illustrated in FIG. 10, the printer 60 includes a supply unit 61, a transportation unit 62, a carriage 63, a carriage drive unit 64, and a control unit 65 (refer to FIG. 11). The printer 60 controls each of the units 61, 62, 64, and the carriage 63 and prints an image on a medium A based on print data input from an external device such as a personal computer.

Configuration of the Supply Unit

The supply unit 61 is a unit that supplies the medium A (a white sheet is illustrated in the present embodiment) which is an image forming target to an image forming position. The supply unit 61 includes a roll body 611 on which the medium A is wound, a roll drive motor (not illustrated), and a roll drive train (not illustrated). The roll drive motor is rotationally driven based on a command from the control unit 65, and a rotation force of the roll drive motor is transferred to the roll body 611 via the roll drive train. In this way, the roll body 611 rotates and the sheet wound on the roll body 611 is supplied toward the downstream side (+Y direction) in the Y direction (sub-scanning direction).

In the present embodiment, an example of supplying the sheet wound on the roll body 611, but it is not limited thereto. For example, the medium A may be supplied by any supplying method, for example, the medium A such as sheets mounted on a tray may be supplied, for example, one by one using a roller.

The transportation unit 62 transports the medium A supplied from the supply unit 61 along the Y direction. The transportation unit 62 is configured to include a transportation roller 621, a driven roller (not illustrated) disposed across the transportation roller 621 and the medium A and is driven by the transportation roller 621, and a platen 622.

When a drive force from the transportation motor (not illustrated) is transferred and the transportation motor is driven by a control by the control unit 65, the transportation roller 621 is rotationally driven by the rotation force, and then, transports the medium A along the Y direction in a state in which the medium A is pinched between the driven roller and the transportation roller 621. In addition, the platen 622 facing the carriage 63 is provided on the downstream side (+Y direction) in the Y direction of the transportation roller 621.

Configuration of the Carriage

The carriage 63 includes an optical module 10 that acquires spectral images for performing the color measuring of the measuring object printed on the medium A, and a printing unit 66 that prints the image on the medium A.

The carriage 63 is provided to be moved by the carriage drive unit 64 along a main scanning direction (X direction) which crosses the Y direction.

In addition, the carriage 63 is connected to the control unit 65 (refer to FIG. 10) through the flexible circuit 631, and executes the print processing (image forming processing on the medium A) using the printing unit 66 and the color measurement processing (refer to first to third embodiments) using the optical module 10 based on the command from the control unit 65.

The printing unit 66 is an image forming unit in the invention and forms an image on the medium A by individually ejecting an ink on the medium A from a part facing the medium A.

Ink cartridges 661 corresponding to multiple colors are detachably mounted on the printing unit 66 and the ink are supplied from each ink cartridge 661 to an ink tank (not illustrated) via a tube (not illustrated). In addition, nozzles (not illustrated) that eject an ink droplet are provided on the lower surface (the position facing the medium A) of the printing unit 66 corresponding each color. For example, piezo-electric elements are arrayed on these nozzles, and the ink droplets supplied from the ink tank are ejected by driving the piezo-electric elements and landed on the medium A to form a dot.

Configuration of the Carriage Moving Unit

The carriage drive unit 64 configures a movement mechanism in the invention and causes the carriage 63 to reciprocate along the X direction based on the command from the control unit 65.

The carriage drive unit 64 is configured to include, for example, a carriage guide shaft 641, a carriage motor 642, and a timing belt 643.

The carriage guide shaft 641 is disposed along the X direction and both ends thereof are fixed to a housing of, for example, the printer 60. The carriage motor 642 drives the timing belt 643. The timing belt 643 is supported to be substantially parallel to the carriage guide shaft 641 and a part of the carriage 63 is fixed thereto. When the carriage motor 642 is driven based on the command from the control unit 65, the timing belt 643 runs forward and reverse, then, the carriage 63 fixed to the timing belt 643 is guided to the carriage guide shaft 641 to reciprocate.

Configuration of the Control Unit

As illustrated in FIG. 11, the control unit 65 is configured to include an I/F 651, a unit control circuit 652, a memory 653, and central processing unit (CPU) 654. The control unit 65 is configured to be capable of realizing functions same as those of the control section 30 in the first to third embodiments.

The I/F 651 inputs the print data input from the external device 70 to the CPU 654.

The unit control circuit 652 includes control circuits that control the optical module 10, the supply unit 61, the transportation unit 62, the carriage drive unit 64, and the printing unit 66, respectively, and control the operations of each of the optical module 10, the printing unit 66, and each units 61, 62, and 64 based on the command signal from the CPU 654. That is, the measuring device in the invention is configured to include the optical module 10 and the control unit 65. The signal processing circuit 13, the voltage control circuit 14, and the light source control circuit 15 illustrated in FIG. 1 may be provided in the unit control circuit 652. In this case, the light source section 11 and the light receiving section 12 in the optical module 10 may be provided in the carriage 63.

The memory 653 stores various programs that control the printer 60 and various data items.

Examples of the various data items includes, for example, V-λ data that indicates a wavelength of the light transmitted through the wavelength variable interference filter 5 with respect to the voltage applied to the electrostatic actuator 56 when controlling the wavelength variable interference filter 5, and print profile data in which the ejection amount of each ink with respect to the color data included as print data is stored. In addition, emission characteristics (emission spectrum) with respect to each wavelength from the light source section 11 (refer to FIG. 1) or light receiving characteristics (light sensitivity characteristics) with respect to each wavelength to the imaging element 16 (refer to FIG. 1) may be stored in the print profile data.

Operational Effects of the Fourth Embodiment

The printer 60 in the present embodiment includes the optical module 10 and is configured to be capable of acquiring the spectral image of the image printed on the medium A and executing the color measurement processing using the spectral image. At this time, the spectral image of which the dynamic range is expanded is acquired using any of the measuring methods described in the first to third embodiments. Therefore, the printer 60 can achieve the effects similar to the color measuring methods described in the first to third embodiments. That is, according to the printer 60, the color measurement of the image can be executed with high accuracy, and thus, it is possible to acquire the results of measuring the color of the image printed by the print unit on the medium A with high accuracy.

Modification of the Embodiments

The invention is not limited to the embodiments described above. Configurations that can be obtained by changes, modifications, and the appropriate combinations of each embodiment described above within a range where the object of the invention can be achieved will be included in the invention.

In each embodiment described above, the configuration is described in which the light receiving section 12 includes the wavelength variable interference filter 5 and the imaging element 16. However, the invention is not limited thereto.

For example, the composite reflectance may be calculated by causing one measurement light to be incident on two imaging elements and performing the weighted composition on the output values from the two corresponding light receiving elements. For example, the light receiving section is configured to include the first imaging element including the first light receiving element, the second imaging element including the second light receiving element, the wavelength variable interference filter, and a light guiding optical system that separates the light from the wavelength variable interference filter and causes the separated lights to be incident on the first imaging element and the second imaging element, and configured to cause the first light receiving element of the first imaging element and the second light receiving element of the second imaging element to receive the measurement light from one position of the measuring object. Even in a case of using this light receiving section, by making the exposure time length or the light sensitivity of each imaging element be different from each other, it is possible to acquire the output values of which the values are different from each other from the two corresponding light receiving elements. Then, by performing the weighted composition on the two output values, it is possible to obtain the effect same as that in the embodiments described above. In addition, it is possible to improve the resolution compared to the case where two light receiving elements of one imaging element configure one pixel. In addition, the two imaging elements are individually driven, and thus, the configuration and the processing can be simplified.

In each embodiment described above, two light receiving elements configure one pixel. However, the invention is not limited thereto. For example, three or more light receiving elements may configure one pixel. For elements configure one pixel, by selecting two output values in ascending order from the output values which do not reach the upper limit value among a plurality of output values that are output from a plurality of light receiving elements after being received from one measurement light, and then, the composite value can be acquired by performing the weighted composition on the two output values.

In the first embodiment described above, the first light receiving element 161 is a light receiving element for short time exposure and the second light receiving element 162 is a light receiving element for long time exposure. However, the invention is not limited thereto, and the first light receiving element 161 may be a light receiving element for long time exposure and the second light receiving element 162 may be a light receiving element for short time exposure. In addition, the light receiving element that is driven as the light receiving element for long time exposure among the first light receiving element 161 and the second light receiving element 162 may be changeable to each other.

In each embodiment described above, when performing the weighted composition, the weight value is set to be varied based on the increase and decrease of the greater output value among the output values from the two light receiving elements. However, the invention is not limited thereto, and the weighted composition may be performed based on the smaller output value. For example, a parameter indicating a relationship between the large and small output values such as a ratio of the large and small output values may be acquired in advance based on the light receiving characteristics of the two light receiving elements, and the greater output value may be estimated based on the smaller output value to perform the weighted composition.

In each embodiment described above, when calculating the composite reflectance as the composite value, the influence due to the difference in the exposure time length of each light receiving element or the difference in the light sensitivity is removed by dividing the first output value and the second output value by the reference values respectively. However, the invention is not limited thereto. Specifically, the influence described above may be removed by executing a correction based on the light receiving characteristics of the first light receiving element and the second light receiving element (for example, based on a ratio of the light receiving characteristics in the measurement wavelengths). In this case, the composite output values may be calculated as the composite value instead of the composite reflectance. In addition, for example, the color measurement values of each light receiving element may be calculated using the result of measuring for a plurality of wavelengths, and the composite color measurement value obtained by performing the weighted composition on the color measurement values may be used as the composite value.

In each embodiment described above, the value of quadratic function is set as the weight value that varies according to the output values of the second light receiving element in the first embodiment and the value of cubic function is set as the weight value that varies according to the output values of the second light receiving element in the second embodiment. However, the invention is not limited thereto. For example, the values of a linear function or a four or higher order of function may be set as the second weight value. In a case using three or higher order of function, it is possible to obtain the effects same as that in the second embodiment by using a polynomial function having a maximum point at the lower limit value and minimum point at the upper limit value in the range of the second output value of which the weight value varies.

In the first embodiment, the lower limit value in the variation range of the second output value of which the weight value varies is the maximum point, and in the second embodiment, the upper limit value in the variation range is the minimum point. However, the invention is not limited thereto, and the lower limit value and the upper limit value in the variation range may be points other than the maximum point and the minimum point in the polynomial function.

In each embodiment described above, the wavelength variable interference filter 5 in which the fixed substrate 51 and the movable substrate 52 are bonded to each other in a state of facing each other, the fixed reflection film 54 is provided on the fixed substrate 51, and the movable reflection film 55 is provided on the movable substrate 52, is described as a spectroscope. However, the invention is not limited thereto.

For example, the configuration may be provided in such a manner that the fixed substrate 51 and the movable substrate 52 may not be bonded to each other and a gap changing section such as the piezo-electric elements which change the gap between the reflection films may be provided between those substrates.

In addition, the invention is not limited to the configuration configured by the two substrates. For example, a wavelength variable interference filter may be used in which two reflection films are stacked on one substrate via a sacrificial layer and the gap is formed by removing the sacrificial layer using etching or the like.

In addition, for example, an acoustic optic tunable filter (AOTF) or a liquid crystal tunable filter (LCTF) may be used as a spectral filter. However, it is preferable to use a Fabry-Perot filter as in the embodiments described above in a view point of the miniaturization of the device.

In each embodiment described above, the color measuring device and the printing device are described as the electronic apparatus in the invention. However, the invention is not limited thereto. For example, the invention may be applied to a spectral camera that acquires spectral images of the measuring object. In addition, for example, the invention may be applied to a quality inspection device that performs a quality inspection on the printed matters manufactured in a factory or the like, and furthermore, the invention can be applied to various electronic apparatuses.

In addition, a specific structure in executing the invention may be configured in appropriate combinations of the embodiments and the execution examples described above within a range of achieving the object of the invention, or may be appropriately changed to other structure or the like.

The entire disclosure of Japanese Patent Application No. 2015-179390, filed Sep. 11, 2015 is expressly incorporated by reference herein.

What is claimed is:

1. A measuring device comprising:
a first light receiving element that receives measurement light from a target object so as to output a first output value, the first light receiving element having first light sensitivity, the first output value corresponding to a first exposure time during which the first light receiving element receives the measurement light;
a second light receiving element that receives the measurement light from the target object so as to output a second output value which is different from the first output value, the second light receiving element having second light sensitivity which is different from the first light sensitivity, the second output value corresponding to a second exposure time during which the second light receiving element receives the measurement light, the second exposure time being different from the first exposure time;
a memory configured to store computer-readable instructions; and
a processor configured to execute the computer-readable instructions so as to:
calculate first and second weight values based on a ratio between the second output value and a maximum output value of the second light receiving element, the first and second weight values being different from each other;
calculate a composite reflectance value of the target object based on the first and second weight values; and
calculate a color measurement result of the target object based on the composite reflectance value.

2. The measuring device according to claim 1,
wherein the second output value is larger than the first output value.

3. The measuring device according to claim 2,
wherein the second weight value becomes smaller as the second output value increases.

4. The measuring device according to claim 3,
wherein the second weight value of the second output value becomes zero when the second output value becomes the maximum output value.

5. An electronic apparatus comprising:
the measuring device according to claim 4; and
a printer configured to print an image on a medium, wherein the target object is the image on the medium.

6. The measuring device according to claim 3,
wherein the second weight value of the second output value is a value of a n-th degree function of the second output value, and
wherein the n-th degree function has a maximum value when the second output value is zero.

7. An electronic apparatus comprising:
the measuring device according to claim 6; and
a printer configured to print an image on a medium, wherein the target object is the image on the medium.

8. The measuring device according to claim 3,
wherein, when the first output value is D1, a reference value of the first output value is Dref1, the second output value is D2, a reference value of the second output value is Dref2, the maximum output value of the second output value is Dmax, and the composite reflectance value is $R_{HDR}$, an Equation (1) described below is satisfied:

$$R_{HDR} = \frac{D1}{Dref1} \times \left(\frac{D2}{Dmax}\right)^2 + \frac{D2}{Dref2} \times \left\{1 - \left(\frac{D2}{Dmax}\right)^2\right\}. \quad (1)$$

9. The measuring device according to claim 3,
wherein the second weight value of the second output value
remains at a first value when the second output value is smaller than a first threshold value,
the second weight value decreases as the second output value increases when the second output value is between the first threshold value and a second threshold value, and
the second weight value remains at a second value which is smaller than the first value when the second output value exceeds the second threshold value.

10. The measuring device according to claim 9,
wherein, when the second output value is between the first threshold value and the second threshold value, the second weight value of the second output value is a value of a n-th degree function of the second output value, and
wherein the n-th degree function has a maximum value when the second output value is the first threshold value.

11. The measuring device according to claim 9,
wherein, when the second output value is between the first threshold value and the second threshold value, the second weight value of the second output value is a value of a n-th degree function of the second output value, and
wherein the n-th degree function has a minimum value when the second output value is the second threshold value.

12. The measuring device according to claim 9,
wherein, when the first output value is D1, a reference value of the first output value is Dref1, the second output value is D2, a reference value of the second output value is Dref2, the first threshold value is d1, the second threshold value is d2, and the composite reflectance value is $R_{HDR}$, an Equation (2) described below is satisfied:

$$R_{HDR} = \frac{D1}{Dref1} \times \left\{-2 \times \left(\frac{D2-d1}{d2-d1}\right)^3 + 3 \times \left(\frac{D2-d1}{d2-d1}\right)^2\right\} + \quad (2)$$

-continued $$\frac{D2}{Dref2} \times \left\{ 2 \times \left(\frac{D2-d1}{d2-d1}\right)^3 - 3 \times \left(\frac{D2-d1}{d2-d1}\right)^2 + 1 \right\}.$$

13. An electronic apparatus comprising:
    the measuring device according to claim 3; and
    a printer configured to print an image on a medium,
    wherein the target object is the image on the medium.
14. An electronic apparatus comprising:
    the measuring device according to claim 2; and
    a printer configured to print an image on a medium,
    wherein the target object is the image on the medium.
15. The measuring device according to claim 1, further comprising:
    a spectroscope that spectrally disperses light from the target object, the spectroscope providing the measurement light to the first light receiving element and the second light receiving element.
16. An electronic apparatus comprising:
    the measuring device according to claim 1; and
    a printer configured to print an image on a medium,
    wherein the target object is the image on the medium.
17. A measuring method for a measuring device, the measuring device including:
    a first light receiving element that receives measurement light from a target object so as to output a first output value, the first light receiving element having first light sensitivity, the first output value corresponding to a first exposure time during which the first light receiving element receives the measurement light;
    a second light receiving element that receives the measurement light from the target object so as to output a second output value which is different from the first output value, the second light receiving element having second light sensitivity which is different from the first light sensitivity, the second output value corresponding to a second exposure time during which the second light receiving element receives the measurement light, the second exposure time being different from the first exposure time;
    a memory configured to store computer-readable instructions; and
    a processor configured to execute the computer-readable instructions, the method comprising executing on the processor the steps of:
    acquiring the first output value and the second output value;
    calculating first and second weight values based on a ratio between the second output value and a maximum output value of the second light receiving element, the first and second weight values being different from each other;
    calculating a composite reflectance value of the target object based on the first and second weight values; and
    calculating a color measurement result of the target object based on the composite reflectance value.
18. The measuring method according to claim 17,
    wherein the second output value is larger than the first output value.
19. The measuring method according to claim 18,
    wherein the second weight value becomes smaller as the second output value increases.
20. The measuring method according to claim 19,
    wherein, when the first output value is D1, a reference value of the first output value is Dref1, the second output value is D2, a reference value of the second output value is Dref2, the maximum output value of the second output value is Dmax, and the composite reflectance value is $R_{HDR}$, an Equation (1) described below is satisfied:

$$R_{HDR} = \frac{D1}{Dref1} \times \left(\frac{D2}{Dmax}\right)^2 + \frac{D2}{Dref2} \times \left\{1 - \left(\frac{D2}{Dmax}\right)^2\right\}. \quad (1)$$

* * * * *